United States Patent
Takano

(10) Patent No.: US 10,638,382 B2
(45) Date of Patent: Apr. 28, 2020

(54) COMMUNICATION CONTROL DEVICE, PROGRAM, COMMUNICATION CONTROL METHOD, AND TERMINAL DEVICE

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/395,307

(22) Filed: Apr. 26, 2019

(65) Prior Publication Data

US 2019/0253940 A1    Aug. 15, 2019

Related U.S. Application Data

(63) Continuation of application No. 14/428,098, filed as application No. PCT/JP2013/070210 on Jul. 25, 2013, now abandoned.

(30) Foreign Application Priority Data

Oct. 30, 2012    (JP) .................................. 2012-238813

(51) Int. Cl.
    *H04W 36/00*    (2009.01)
    *H04W 72/04*    (2009.01)
    (Continued)

(52) U.S. Cl.
    CPC ....... *H04W 36/0072* (2013.01); *H04W 48/10* (2013.01); *H04W 48/12* (2013.01);
    (Continued)

(58) Field of Classification Search
    CPC . H04W 36/0072; H04W 36/22; H04W 48/10; H04W 48/12; H04W 72/0453;
    (Continued)

(56) References Cited

U.S. PATENT DOCUMENTS

2005/0130662 A1    6/2005    Murai
2007/0161377 A1    7/2007    Kodikara Patabandi et al.
(Continued)

FOREIGN PATENT DOCUMENTS

JP    2010-527178 A    8/2010
JP    2011-142550 A    7/2011
(Continued)

OTHER PUBLICATIONS

Office Action dated Mar. 27, 2018 in corresponding Japanese Patent Application No. 2014-544350, 4 pages.
(Continued)

*Primary Examiner* — Jenee Holland
(74) *Attorney, Agent, or Firm* — Xsenus LLP

(57) ABSTRACT

There is provided a communication control device including an acquisition unit configured to acquire system information of a frequency band that is used in a small cell that is partially or entirely overlapped by a macro cell, and a control unit configured to control downlink transmission of the system information in the macro cell. The control unit notifies a terminal device positioned within the macro cell of radio resource that is used in the downlink transmission.

11 Claims, 19 Drawing Sheets

(51) Int. Cl.
  *H04W 48/12* (2009.01)
  *H04W 36/22* (2009.01)
  *H04W 84/04* (2009.01)
  *H04W 16/32* (2009.01)
  *H04W 48/10* (2009.01)

(52) U.S. Cl.
  CPC ........ *H04W 72/0453* (2013.01); *H04W 16/32* (2013.01); *H04W 36/22* (2013.01); *H04W 72/0426* (2013.01); *H04W 84/045* (2013.01)

(58) Field of Classification Search
  CPC ............. H04W 72/0426; H04W 16/32; H04W 84/045
  See application file for complete search history.

(56) References Cited

U.S. PATENT DOCUMENTS

| | | |
|---|---|---|
| 2008/0081645 A1 | 4/2008 | Kim et al. |
| 2008/0161013 A1 | 7/2008 | Friman |
| 2009/0005046 A1 | 1/2009 | Won et al. |
| 2009/0232163 A1 | 9/2009 | Lee et al. |
| 2009/0252073 A1 | 10/2009 | Kim et al. |
| 2009/0262693 A1* | 10/2009 | Wang .................... H04W 48/12 370/329 |
| 2009/0325634 A1 | 12/2009 | Bienas et al. |
| 2010/0008317 A1 | 1/2010 | Bhattad et al. |
| 2010/0111062 A1 | 5/2010 | Cho et al. |
| 2010/0113049 A1 | 5/2010 | Lee et al. |
| 2010/0240397 A1 | 9/2010 | Buchmayer et al. |
| 2011/0013600 A1 | 1/2011 | Kim et al. |
| 2011/0064164 A1 | 3/2011 | Seo et al. |
| 2011/0075621 A1 | 3/2011 | Sung et al. |
| 2011/0092207 A1 | 4/2011 | Motohashi et al. |
| 2011/0098055 A1 | 4/2011 | Kwon et al. |
| 2011/0128916 A1 | 6/2011 | Kwon et al. |
| 2011/0151867 A1 | 6/2011 | Hirano et al. |
| 2011/0183675 A1 | 7/2011 | Bae et al. |
| 2011/0223915 A1 | 9/2011 | Kwack et al. |
| 2011/0237239 A1 | 9/2011 | Chou et al. |
| 2011/0244870 A1 | 10/2011 | Lee |
| 2011/0250890 A1 | 10/2011 | Chen |
| 2011/0319079 A1 | 12/2011 | Nakata et al. |
| 2012/0069803 A1 | 3/2012 | Iwamura et al. |
| 2012/0077490 A1 | 3/2012 | Kawabe et al. |
| 2012/0134275 A1 | 5/2012 | Choi et al. |
| 2012/0142334 A1 | 6/2012 | Sato et al. |
| 2012/0142361 A1* | 6/2012 | Zhao .................... H04W 36/28 455/446 |
| 2012/0178482 A1 | 7/2012 | Seo et al. |
| 2012/0201162 A1 | 8/2012 | Kim et al. |
| 2012/0213171 A1 | 8/2012 | Jeong et al. |
| 2012/0213189 A1 | 8/2012 | Choi et al. |
| 2012/0225662 A1 | 9/2012 | Jo et al. |
| 2012/0257541 A1 | 10/2012 | Li et al. |
| 2012/0281566 A1* | 11/2012 | Pelletier ................ H04W 76/27 370/252 |
| 2012/0281576 A1 | 11/2012 | Yamada et al. |
| 2012/0294269 A1 | 11/2012 | Yamada et al. |
| 2013/0012252 A1 | 1/2013 | Suzuki et al. |
| 2013/0028069 A1* | 1/2013 | Pelletier ............ H04W 72/0453 370/216 |
| 2013/0039195 A1 | 2/2013 | Weng et al. |
| 2013/0109372 A1 | 5/2013 | Ekici |
| 2013/0157669 A1 | 6/2013 | Turtinen et al. |
| 2013/0235858 A1* | 9/2013 | Zhao .................. H04W 56/0045 370/336 |
| 2013/0252626 A1 | 9/2013 | Lee et al. |
| 2013/0279359 A1 | 10/2013 | Zhang et al. |
| 2013/0294338 A1 | 11/2013 | Zhang et al. |
| 2013/0294351 A1 | 11/2013 | Kwon et al. |
| 2013/0295946 A1* | 11/2013 | Panchal ................ H04W 16/14 455/452.1 |
| 2014/0016598 A1 | 1/2014 | Kwon et al. |
| 2014/0269451 A1* | 9/2014 | Papasakellariou ... H04B 7/2656 370/280 |
| 2014/0308953 A1 | 10/2014 | Park et al. |
| 2015/0085769 A1 | 3/2015 | Parkvall et al. |
| 2016/0029376 A1 | 1/2016 | Fukuta et al. |

FOREIGN PATENT DOCUMENTS

| | | |
|---|---|---|
| JP | 2012-104959 A | 5/2012 |
| JP | 2012-512591 A | 5/2012 |
| JP | 2012-523745 A | 10/2012 |
| WO | 2011/005019 A2 | 1/2011 |
| WO | 2011/005416 A2 | 1/2011 |
| WO | 2012/138087 A2 | 10/2012 |

OTHER PUBLICATIONS

Japanese Office Action dated Aug. 15, 2017 in Patent Application No. 2014-544350.
Extended European Search Report dated Jun. 8, 2016 in Patent Application No. 13851043.3.
International Search Report and Written Opinion dated Sep. 17, 2013 in PCT/JP2013/070210.
Japanese Office Action issued in corresponding Japanese Patent Application No. 2014-544350 dated Jul. 16, 2019.
Extended Search Report issued in European Application 19177068. 4-1214 dated Sep. 10, 2019.
Alcatel-Lucent, "How to Capture RN Specific Procedures", 3GPP TSG-RAN WG2 Meeting #70bis, R2-103681, 3 Pages total, (Jun. 28-Jul. 2, 2010).
Huawei, "Remaining Issues on Cross-Carrier PDCCH indication", 3GPP TSG RAN WG1 Meeting #59b, R1-100241, 4 Pages total, (Jan. 18-22, 2010).

* cited by examiner

FIG. 7

| CELL ID | CELL ID | CELL ID |
|---|---|---|
| LPSI (LOCATION OF PICO SYSTEM INFO) | LPSI (LOCATION OF PICO SYSTEM INFO) | LPSI (LOCATION OF PICO SYSTEM INFO) |

FIG. 17

| CELL ID | LPSI | UPDATE INFO |
|---------|------|-------------|
| CELL ID | LPSI | UPDATE INFO |
| CELL ID | LPSI | UPDATE INFO |

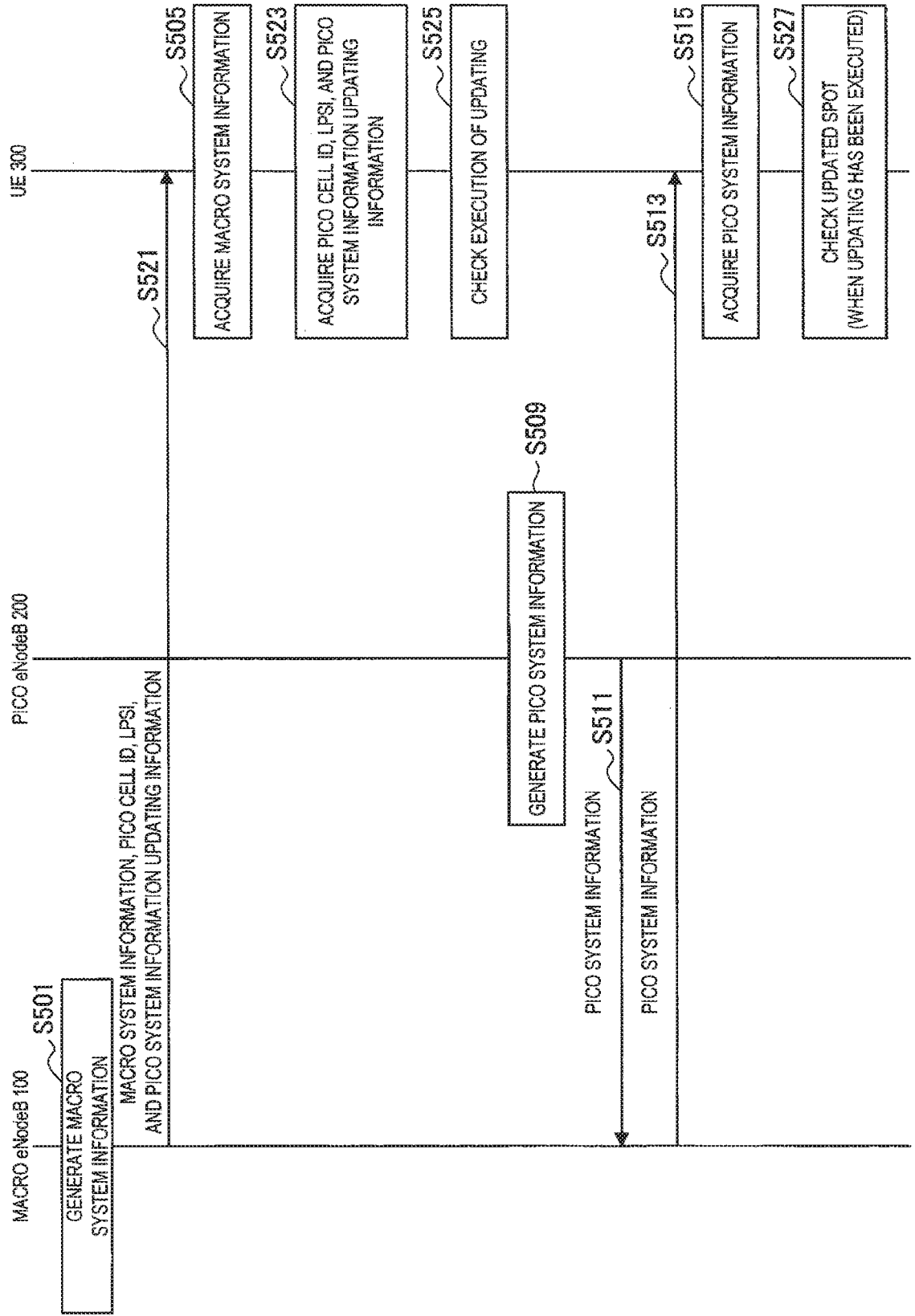

COMMUNICATION CONTROL DEVICE, PROGRAM, COMMUNICATION CONTROL METHOD, AND TERMINAL DEVICE

CROSS-REFERENCE TO RELATED APPLICATIONS

The present application is a continuation of U.S. application Ser. No. 14/428,098, filed Mar. 13, 2015, which is based on PCT filing PCT/JP2013/070210, filed Jul. 25, 2013, and claims priority to JP 2012-238813, filed Oct. 30, 2012, the entire contents of each are incorporated herein by reference.

TECHNICAL FIELD

The present disclosure relates to a communication control device, a program, a communication control method, and a terminal device.

BACKGROUND ART

Currently, increasing data traffic in cellular systems caused by spread of smartphones is a concern. For this reason, expanding communication capacities of the cellular systems become more and more important for each cellular business operator. In order to expand the communication capacities, the business operators dispose, for example, small cells such as pico cells and femto cells within macro cells. Accordingly, the business operators can gain more communication capacities from advantages of cell splitting.

Generally in a macro cell, system information of the macro cell is transmitted from a base station of the macro cell. Likewise in a small cell, system information of the small cell is transmitted from a base station of the small cell. Technologies pertaining to transmission methods of such system information of small cells have also been proposed.

For example, Patent Literature 1 discloses a technology in which a base station of a femto cell transmits subframes that constitute a subframe set including a plurality of kinds of subframes and are included in the subframe set in a predetermined order, in order to prevent deterioration in performance of a system.

CITATION LIST

Patent Literature

Patent Literature 1: JP 2012-523745T

SUMMARY OF INVENTION

Technical Problem

According to the existing techniques for transmission of system information including the technique disclosed in Patent Literature 1, however, system information of small cells is transmitted only by base stations of the small cells. For this reason, an area in which a terminal device can receive the system information of the small cells is limited. Thus, there may be cases in which the terminal device has not acquired the system information of the small cells when it has just entered or come close to the small cells. As a result, spending much time in connection of the terminal device in the small cells is a concern. For example, spending much time in, for example, specifying a cell in a cell search, receiving system information thereof after the cell search, and the like is a concern. Due to the fact that a small cell is smaller than a macro cell, the frequency of the terminal device entering and exiting a small cell is considered to be higher than the frequency of the terminal device entering and exiting a macro cell, and thus spending much time as described above is not favorable.

Therefore, it is desirable to provide a mechanism in which a time taken for connection of a terminal device in a small cell can be further shortened.

Solution to Problem

According to the present disclosure, there is provided a communication control device including an acquisition unit configured to acquire system information of a frequency band that is used in a small cell that is partially or entirely overlapped by a macro cell, and a control unit configured to control downlink transmission of the system information in the macro cell. The control unit notifies a terminal device positioned within the macro cell of radio resource that is used in the downlink transmission.

In addition, according to the present disclosure, there is provided a program causing a computer to function as an acquisition unit configured to acquire system information of a frequency band that is used in a small cell that is partially or entirely overlapped by a macro cell, and a control unit configured to control downlink transmission of the system information in the macro cell. The control unit notifies a terminal device positioned within the macro cell of radio resource that is used in the downlink transmission.

In addition, according to the present disclosure, there is provided a communication control method including acquiring system information of a frequency band that is used in a small cell that is partially or entirely overlapped by a macro cell, controlling downlink transmission of the system information in the macro cell, and notifying a terminal device positioned within the macro cell of radio resource that is used in the downlink transmission.

According to the present disclosure, there is provided a communication control device including a generation unit configured to generate system information of a frequency band that is used in a small cell that is partially ore entirely overlapped by a macro cell, and a provision unit configured to provide the system information to the device that is a device controlling downlink transmission of the system information in the macro cell and notifying a terminal device positioned within the macro cell of radio resource that is used in the downlink transmission.

In addition, according to the present disclosure, there is provided a program causing a computer to function as a generation unit configured to generate system information of a frequency band that is used in a small cell that is partially or entirely overlapped by a macro cell, and a provision unit configured to provide the system information to a device that is a device controlling downlink transmission of the system information in the macro cell and notifying a terminal device positioned within the macro cell of radio resource that is used in the downlink transmission.

In addition, according to the present disclosure, there is provided a communication control method including generating system information of a frequency band that is used in a small cell that is partially or entirely overlapped by a macro cell, and providing the system information to a device that is a device controlling downlink transmission of the system information in the macro cell and notifying a terminal device positioned within the macro cell of radio resource that is used in the downlink transmission.

According to the present disclosure, there is provided a terminal device including a wireless communication unit configured to receive system information of a frequency band that is used in a small cell that is partially or entirely overlapped by a macro cell when the terminal device is positioned within the macro cell, and an acquisition unit configured to acquire information transmitted using radio resource as the system information when the terminal device is positioned within the macro cell and the radio resource that is used in downlink transmission of the system information is notified of.

In addition, according to the present disclosure, there is provided a communication control method including receiving system information of a frequency band that is used in a small cell that is partially or entirely overlapped by a macro cell when a terminal device is positioned within the macro cell, and acquiring information transmitted using radio resource as the system information when the terminal device is positioned within the macro cell and the radio resource that is used in downlink transmission of the system information is notified of.

Advantageous Effects of Invention

According to the present disclosure as described above, it is possible to further shorten a time taken for connection of a terminal device in a small cell.

BRIEF DESCRIPTION OF DRAWINGS

FIG. 7 is an illustrative diagram for describing an example of information transmitted for notification of radio resource used in transmission of system information of a pico cell side.

FIG. 17 is an illustrative diagram for describing an example of information transmitted for notification of updating of system information of a pico cell side.

FIG. 19 is a sequence diagram showing an example of a schematic flow of a communication control process according to a second modified example of an embodiment.

DESCRIPTION OF EMBODIMENTS

Figure 1:
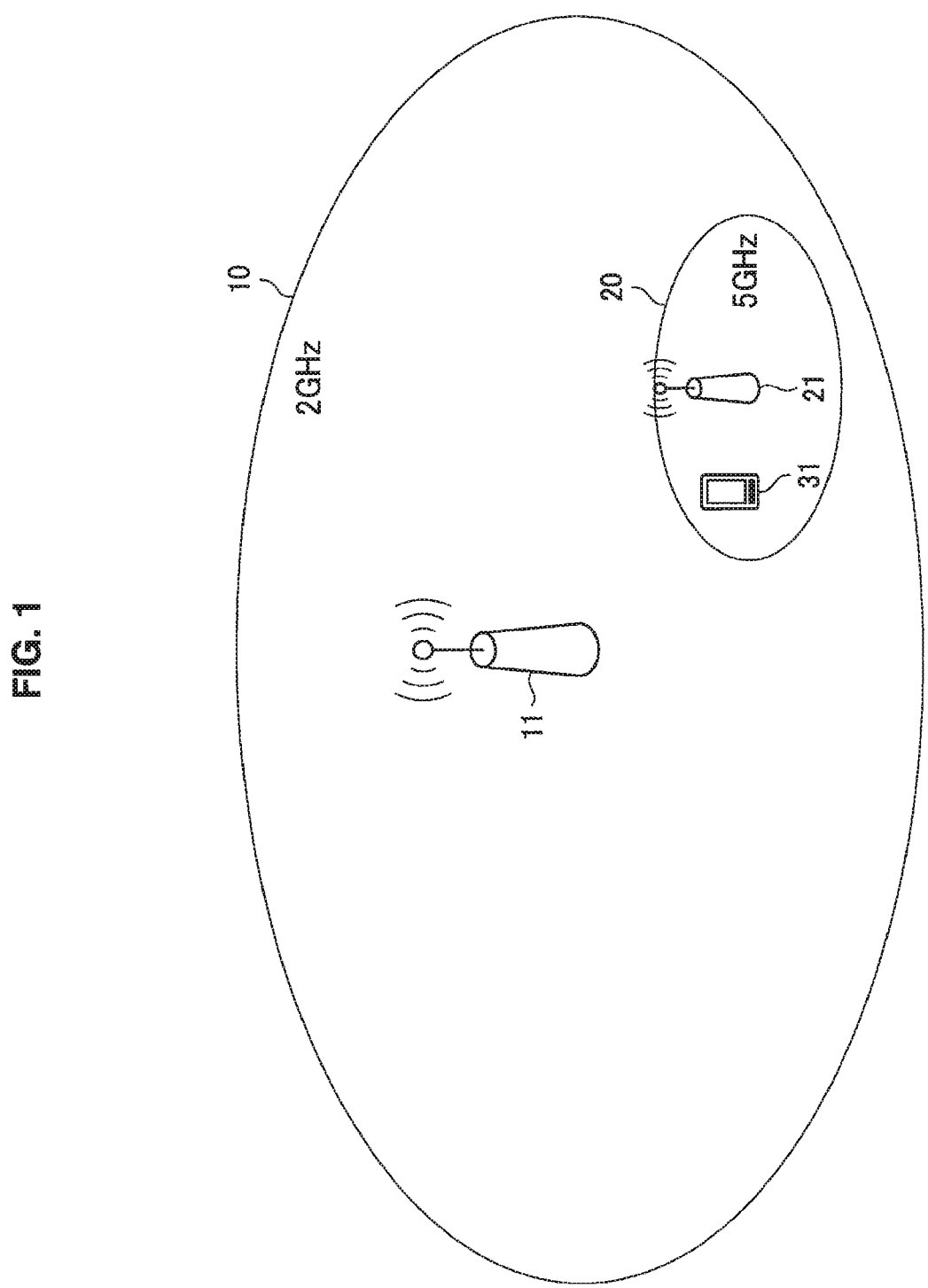
FIG. 1 is an illustrative diagram for describing an example of a scenario in which a macro cell and a small cell use different frequency bands.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. Preface
  1.1. Wireless communication technology of the 3GPP
  1.2. Technical problem
2. Schematic configuration of a wireless communication system
3. Configurations of respective devices
  3.1. Configuration of a macro eNodeB
  3.2. Configuration of a pico eNodeB
  3.3. Configuration of a UE
4. Process flow
5. Modified examples
  5.1. First modified example
    5.1.1. Overview
    5.1.2. Configurations of respective devices
    5.1.3. Process flow
  5.2. Second modified example
    5.2.1. Overview
    5.2.2. Configurations of respective devices
    5.2.3. Process flow
6. Conclusion

1. PREFACE

First, a wireless communication technology of the 3rd Generation Partnership Project (3GPP) and technical challenges thereof will be described.

1.1. Wireless Communication Technology of the 3GPP

Hereinafter, the wireless communication technology of the 3GPP will be described with reference to FIGS. 1 to 4.
(Small Cell of Release 10)
There is a mention in Release 10 as well as Release 11 of the 3GPP of small cells (to be specific, pico cells). In Release 10 and Release 11, a base station is referred to as an eNodeB, and particularly, an eNodeB of a macro cell is referred to as a macro eNodeB, and an eNodeB of a pico cell is referred to as a pico eNodeB.

A pico cell is partially or entirely overlapped by a macro cell, and for example, a macro eNodeB and a pico eNodeB use the same frequency band. Such a network is referred to as a heterogeneous network (Het-Net). Reducing interference between a macro eNodeB and a pico eNodeB in a Het-Net is an important task, and thus the 3GPP has been vigorously discussed a technology for reducing such interference. For example, providing a subframe that is called an almost blank subframe (ABS) in which most transmissions stop on a macro cell (macro eNodeB) side and the like have been reviewed.

(Small Cell that is Assumed in Release 12)

On the other hand, a scenario in which a macro eNodeB and a pico eNodeB use different frequency bands is expected to be reviewed as a scenario of Release 12. Hereinbelow, this point will be described in more detail with reference to FIG. 1.

FIG. 1 is an illustrative diagram for describing an example of the scenario in which a macro cell and a small cell use different frequency bands. Referring to FIG. 1, a macro cell 10 and a macro eNodeB 11 are shown. In addition, a pico cell 20 that is entirely overlapped by the macro cell 10 and a pico eNodeB 21 are shown. Furthermore, a user equipment (UE) 31 that communicates with the macro eNodeB and the pico eNodeB is shown. On such a network, for example, the macro eNodeB 11 performs wireless communication with the UE 31 using a frequency band of the 2 GHz band within the macro cell 10. In addition, for example, the pico eNodeB 21 performs wireless communication with the UE 31 using a frequency band of the 5 GHz band within the pico cell 20.

(Carrier Aggregation of Release 10)

Component Carrier

In carrier aggregation of Release 10, up to five component carriers (CCs) are bundled and used in a UE. Each CC is a bandwidth of up to 20 MHz. In carrier aggregation, CCs continuing in a frequency direction are used in some cases and CCs separated in the frequency direction are used in some cases. In carrier aggregation, the CCs to be used can be set for each UE.

Primary CC and Secondary CC

In carrier aggregation, one of the plurality of CCs used by the UE is a special CC. The one special CC is referred to as a primary component carrier (PCC). Of the plurality of CCs, the remaining CCs are referred to as secondary component carriers (SCCs). The PCC can differ for each UE. This point will be described more specifically below with reference to FIG. 2.

Figure 2:
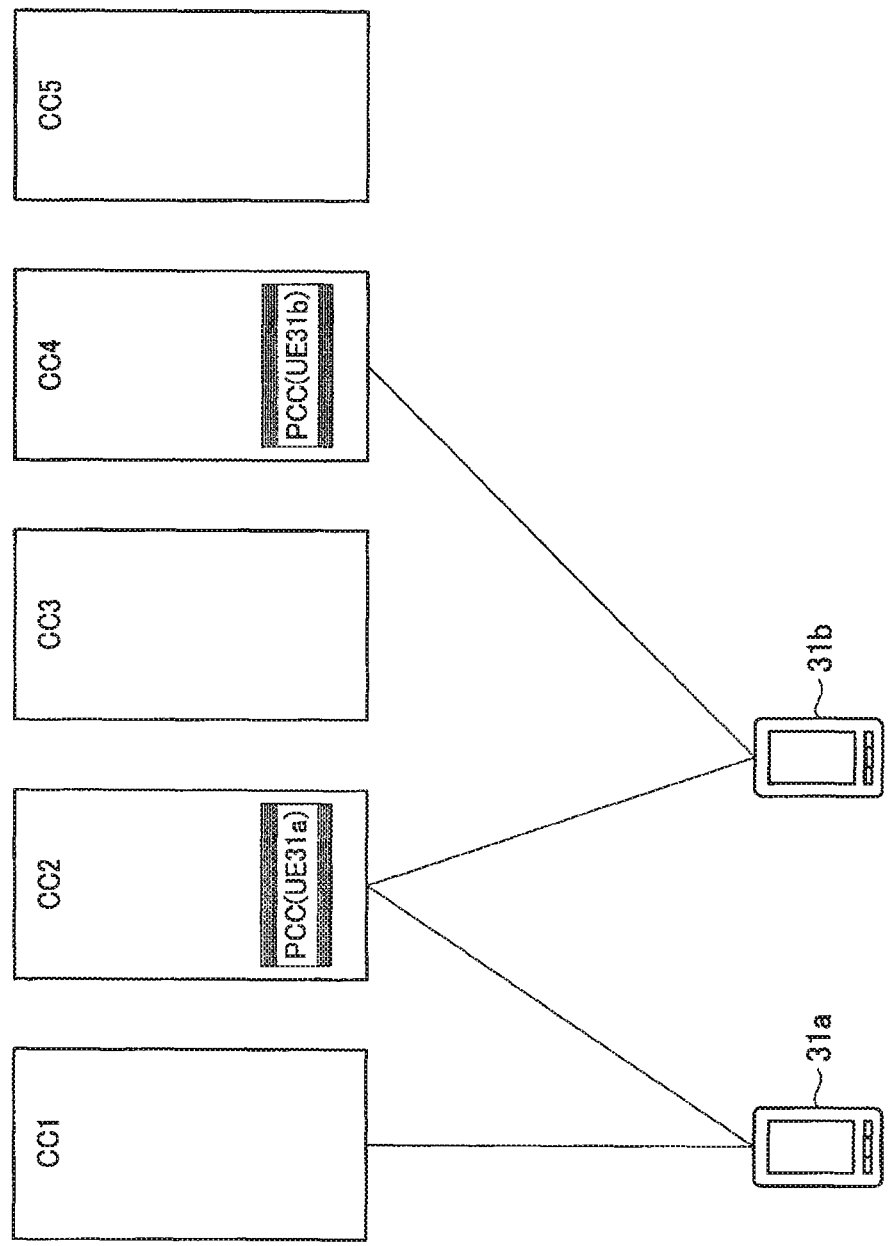
FIG. 2 is an illustrative diagram for describing an example of PCCs of each UE.

FIG. 2 is an explanatory diagram illustrating an example of the PCC of each UE. A UE 31a, a UE 31b, and five CCs 1 to 5 are illustrated in FIG. 2. In this example, the UE 31a uses two CCs, the CC 1 and the CC 2. The UE 31a uses the CC 2 as the PCC. On the other hand, the UE 31b uses two CCs, the CC 2 and the CC 4. The UE 31b uses the CC 4 as the PCC. In this way, each UE can use a different CC as the PCC.

Since the PCC is the most important CC among the plurality of CCs, the CC for which communication quality is the stablest is preferable. Which CC is used as the PCC actually depends the way in which they are installed.

The CC with which a UE initially establishes connection is the PCC in the UE. The SCC is added to the PCC. That is, the PCC is a main frequency band and the SCC is an auxiliary frequency band. The SCC is changed by deleting the existing SCC and adding a new SCC. The PCC is changed in an inter-frequency handover sequence of the related art. In carrier aggregation, a UE may not use only the SCC, but necessarily uses one PCC.

The PCC is also referred to as a primary cell. The SCC is also referred to as a secondary cell.

(System Information)

System information includes a master information block (MIB) and a system information block (SIB). An MIB includes vital information for receiving data in a first stage such as a bandwidth to be used, a system frame number (SFN), a configuration of a hybrid ACK, and the like. In addition, an SIB includes other system information. Information included in an MIB is more important information than information included in an SIB.

An MIB is transmitted on a physical broadcast channel (PBCH). Hereinbelow, a PBCH on which an MIB is transmitted will be described in detail.

Figure 3:
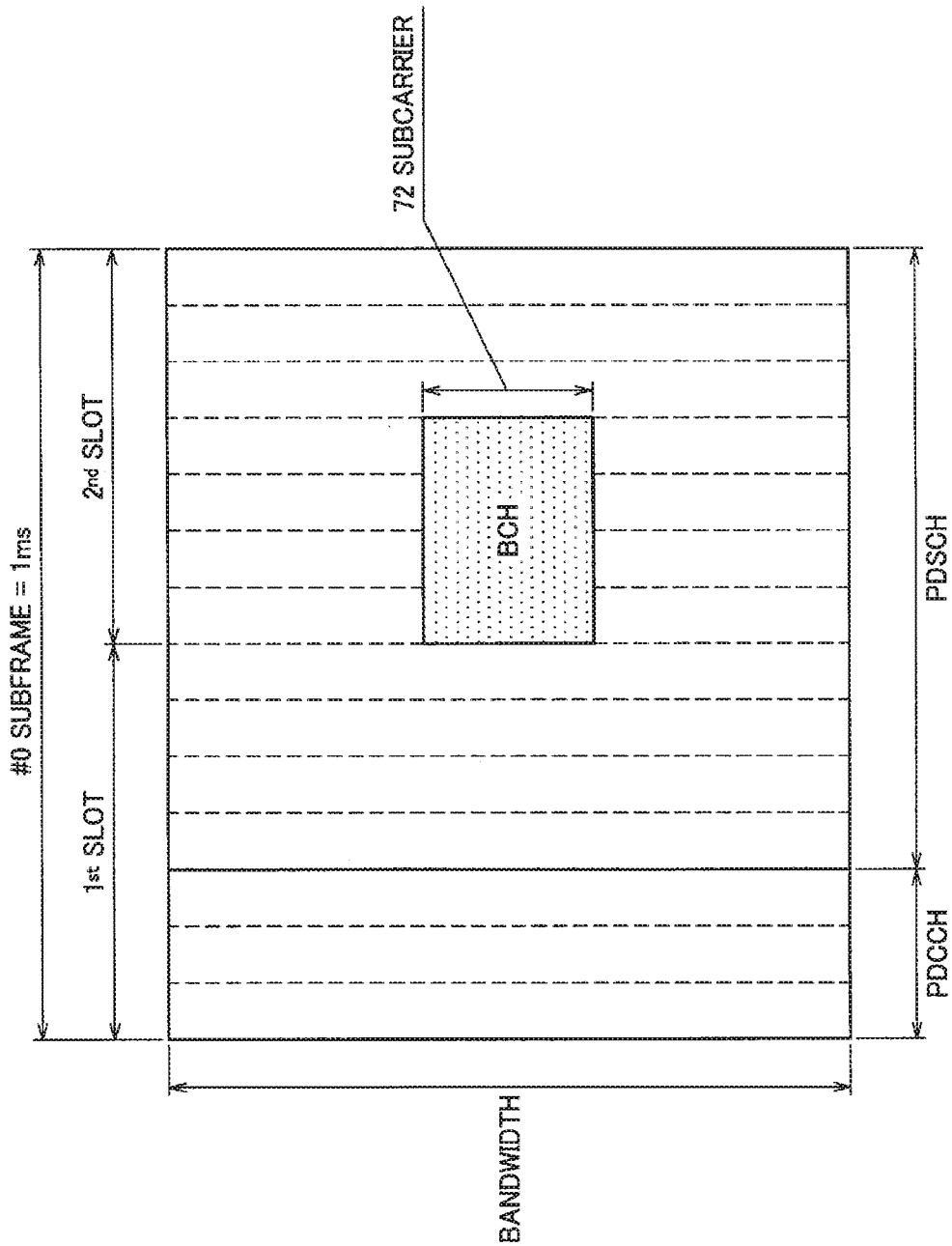
FIG. 3 is an illustrative diagram for describing a physical broadcast channel (PBCH) on which an MIB is transmitted.

FIG. 3 is an illustrative diagram for describing a physical broadcast channel (PBCH) on which an MIB is transmitted. Referring to FIG. 3, radio resource of a frequency band in a #0 subframe are shown. The #0 subframe is one of 10 subframes (#0 to #9 subframes) included in a 10 ms radio frame (Radio Frame). Referring to FIG. 3, the subframe includes two slots. In addition, each slot includes 7 OFDM symbols. 1 to 3 OFDM symbols of the first slot are physical downlink control channels (PDCCH), and 4 to 7 OFDM symbols of the first slot and the second slot are physical downlink shared channels (PDSCH). In addition, particularly in the #0 subframe, a PBCH is positioned in the range of 72 subcarriers at the center of a frequency band in the frequency direction and 1 to 4 OFDM symbols of the second slot in the time direction. In other words, a PBCH is disposed over six resource blocks. An MIB is transmitted on this PBCH.

In addition, an SIB is transmitted on a physical downlink shared channel (Physical Downlink Shared Channel). Particularly, an SIB 1 of SIBs is transmitted in a #5 subframe of a radio frame whose SFN is an even number. This will be described in detail with reference to FIG. 4.

Figure 4:
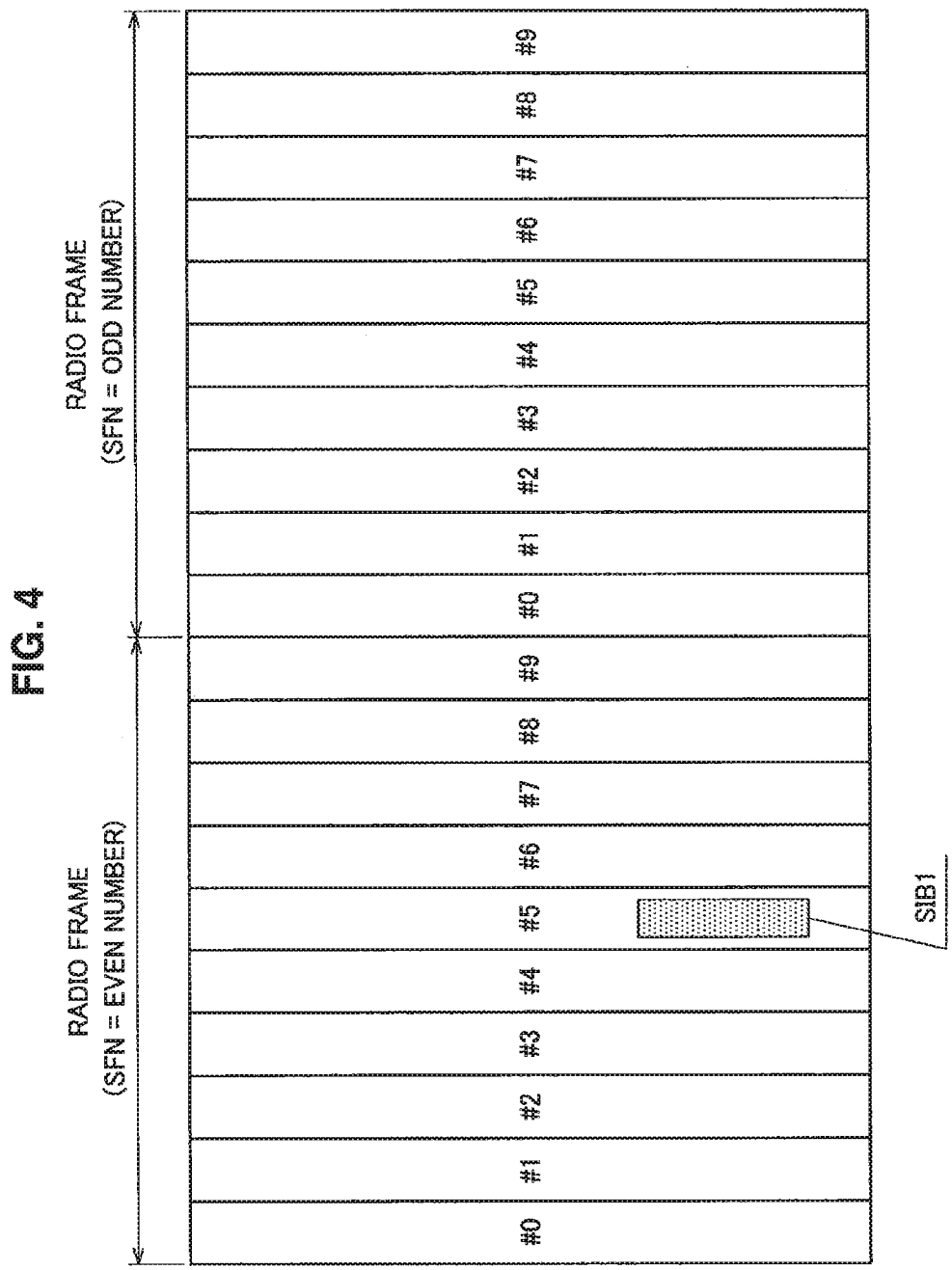
FIG. 4 is an illustrative diagram for describing subframes transmitted by SIB 1.

FIG. 4 is an illustrative diagram for describing a subframe in which the SIB 1 is transmitted. Referring to FIG. 4, two consecutive radio frames, i.e., a radio frame whose SFN is an even number and a radio frame whose SFN is an odd number are shown. In addition, the SIB 1 is transmitted in the #5 subframe of the radio frame whose SFN is an even number. On the other hand, the SIB 1 is not transmitted in the radio frame whose SFN is an odd number. The SIB 1 is transmitted in a fixed subframe as above.

Note that an MIB indicates at which position in the frequency direction of the #5 subframe of the radio frame whose SFN is an even number the SIB 1 is transmitted. For this reason, the SIB 1 is not transmitted completely at a fixed position, but transmitted at a semi-fixed position, different from an MIB. Note that a position in the time direction (i.e., an OFDM symbol) in the #5 subframe in which the SIB 1 is transmitted is fixed.

In addition, SIBs 2 to 11 among SIBs are not entirely transmitted in a fixed subframe, like the SIB 1. The SIBs 2 to 11 are transmitted using the radio resource represented by the SIB 1.

(Paging)

In LTE, there are an RRC connected (RRC_Connected) mode and an RRC idle (RRC_Idle) mode as modes of a UE.

When the mode of a UE is the RRC connected mode, connection between the UE and an eNodeB is established, and thereby transmission and reception of uplink signals and downlink signals are possible.

On the other hand, when the mode of the UE is the RRC idle mode, the eNodeB does not have information of the UE, and a tracking area in which the UE is present is registered in a mobility management entity (MME). An MME is a node that is wire-connected to the eNodeB in an S1-MME interface. A tracking area is an area that includes dozens to hundreds of cells close to each other.

When there is an incoming call to the UE, the MME performs calling-out at a paging channel in all cells included in the tracking area of the UE. In other words, the UE in the RRC idle mode monitors the paging channel, and when there is an incoming call to the UE, the mode of the device transitions from the RRC idle mode to the RRC connection mode.

The UE in the RRC idle mode performs power saving such as stopping a clock of hardware, stopping power supply, or the like in order to reduce power consumption except for the time at which information is transmitted on the paging channel. In addition, when the time at which information is transmitted on the paging channel arrives, the UE turns the power on, receives the information on the paging channel, and then performs power saving again after the reception.

(Updating of System Information)

Updating of system information (System Information Update) is notified of on the paging channel. In addition, updating of system information is also notified of by the SIB 1 of the system information.

(System Information in Carrier Aggregation and Updating Thereof)

In carrier aggregation, system information is provided by all component carriers (CC). In addition, since the SIB 1 is transmitted by all CCs, updating of the system information is notified of by all CCs. A UE applied to carrier aggregation, however, can be aware of updating of the system information of all CCs by monitoring only the PCC.

1.2. Technical Challenge

Next, a technical challenge that is also relevant to the above-described technology will be described.

Generally in a macro cell, system information of the macro cell is transmitted by a macro eNodeB. In addition, likewise in a pico cell, system information of the pico cell is transmitted by a pico eNodeB. A technology relating to a transmission method of system information of such a small cell has also been proposed.

JP 2012-523745A, for example, discloses a technology in which a base station of a femto cell transmits subframes that constitutes a subframe set that includes a plurality kinds of subframes and are included in the subframe set in a predetermined order to prevent deterioration in performance of a system.

According to the transmission method of system information of the related art described above, however, system information of a pico cell is transmitted entirely by a pico eNodeB. For this reason, due to low transmission electric power, a high frequency band, or the like, for example, an area in which a UE can receive the system information of the pico cell is limited. Thus, there are also cases in which the UE has not yet acquired the system information of the pico cell when the UE has just entered or come close to the pico cell. For example, the UE can fail to acquire the system information of the pico cell when the UE enters the pico cell at a high speed. As a result, spending much time in connection of a UE in a small cell is a concern. A UE, for example, the UE, specifies a pico cell among all pico cell candidates in a cell search based on a primary synchronization signal (PSS) and a secondary synchronization signal (SSS), and thus specification of a cell can require much time. In addition, since the UE newly receives system information after the cell search, for example, the reception of the system information can take much time as well. The frequency of a UE entering and exiting a small cell is higher than the frequency of the UE entering and exiting a macro cell due to the fact that a small cell is smaller than a macro cell, and thus spending much time as described above is not favorable.

Therefore, embodiments of the present disclosure enable a time taken for connection of a UE in a pico cell to be further shortened. Hereinbelow, details thereof will be described in <<<2. Schematic configuration of a wireless communication system>>>, <<<3. Configurations of respective devices>>>, <<<4. Process flow>>>, and <<<5. Modified examples>>>.

2. SCHEMATIC CONFIGURATION OF A WIRELESS COMMUNICATION SYSTEM

Figure 5:
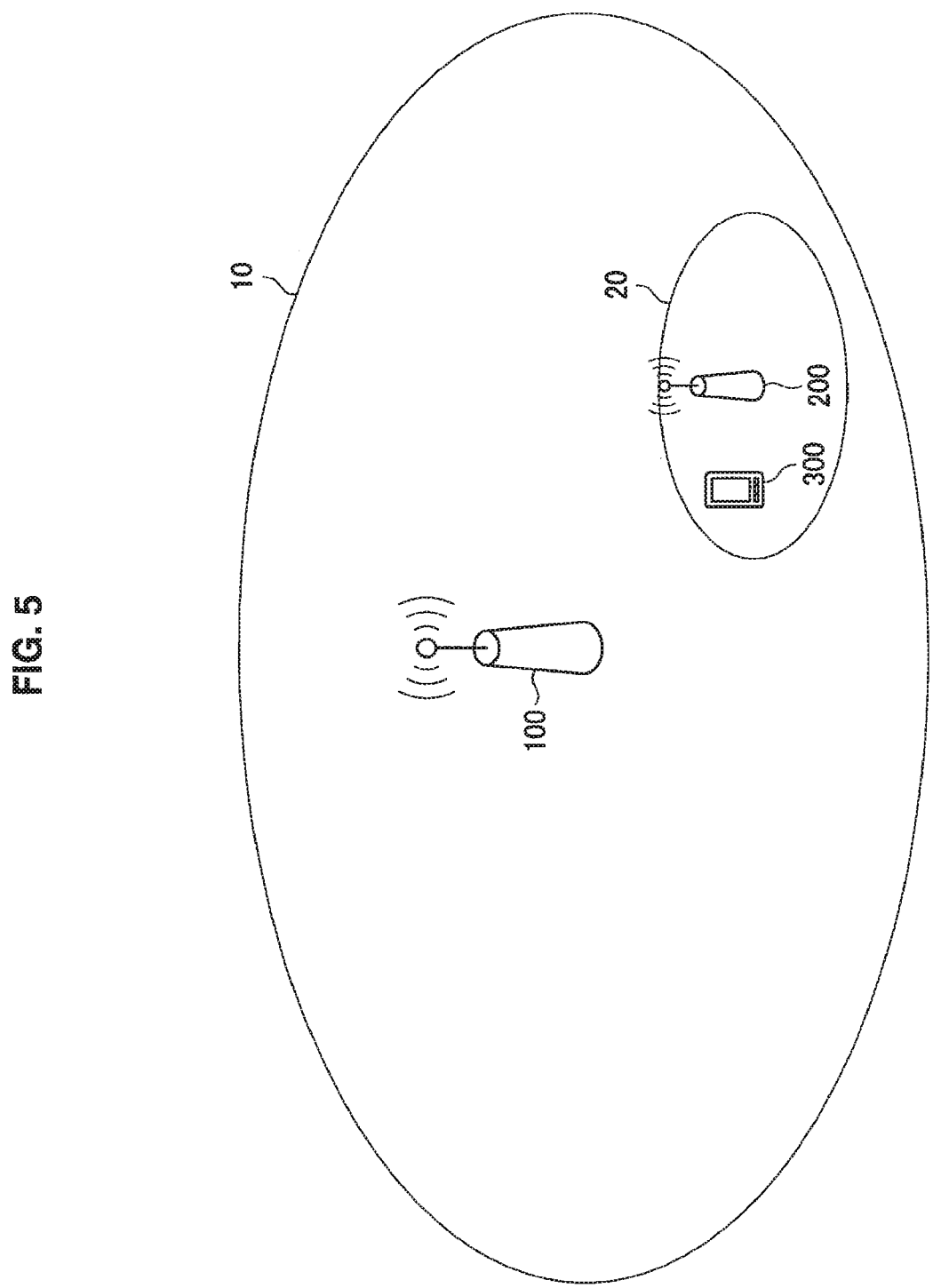
FIG. 5 is an illustrative diagram showing an example of a schematic configuration of a wireless communication system according to an embodiment.

A schematic configuration of a wireless communication system according to an embodiment of the present disclosure will be described with reference to FIG. 5. FIG. 5 is an illustrative diagram showing an example of the schematic configuration of the wireless communication system according to the present embodiment. The wireless communication system is a wireless communication system based on, for example, LTE. Referring to FIG. 5, the wireless communication system includes a macro eNodeB 100 of the macro cell 10 and a pico eNodeB 200 of the pico cell 20, and a UE 300.

The macro eNodeB 100 wirelessly communicates with the UE 300 within the macro cell 10. As an example, a frequency band of the 2 MHz band is used within the macro cell 10 for wireless communication between the macro eNodeB 100 and the UE 300.

The pico eNodeB 200 wirelessly communicates with the UE 300 within the pico cell 20. The pico cell 20 is partially or entirely overlapped by the macro cell 10. Within the pico cell 20, for example, a different frequency band from the frequency band used in the macro cell 10 is used. To be specific, a frequency band used within the pico cell 20, for example, is a higher frequency band than the frequency band used within the macro cell 10. As an example, a frequency band of the 5 MHz band is used in wireless communication between the pico eNodeB 200 and the UE 300 within the pico cell 20.

The UE 300 wirelessly communicates with the macro eNodeB 100 within the macro cell 10. In addition, the UE 300 wirelessly communicates with the pico eNodeB 200 within the pico cell 20.

3. CONFIGURATIONS OF RESPECTIVE DEVICES

Next, examples of respective configurations of the macro eNodeB 100, the pico eNodeB 200, and the UE 300 will be described with reference to FIGS. 6 to 10.

3.1. Configuration of a Macro eNodeB

Figure 6:
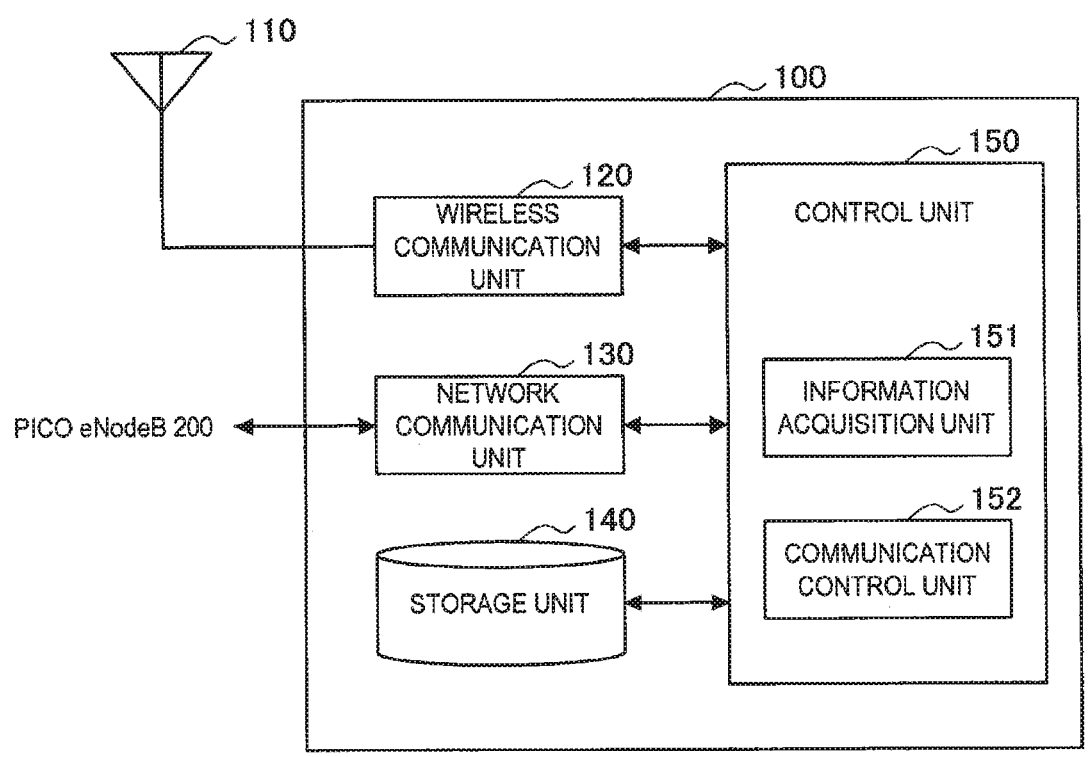
FIG. 6 is a block diagram showing an example of a configuration of a macro eNodeB according to an embodiment.

First, an example of a configuration of the macro eNodeB 100 will be described with reference to FIGS. 6 to 8. FIG. 6 is a block diagram showing the example of the configuration of the macro eNodeB 100 according to the present embodiment. Referring to FIG. 6, the macro eNodeB 100 is provided with an antenna unit 110, a wireless communication unit 120, a network communication unit 130, a storage unit 140, and a control unit 150.

(Antenna Unit 110)

The antenna unit 110 receives a radio signal and outputs the received radio signal to the radio communication unit 120. The antenna unit 110 transmits a transmission signal output by the radio communication unit 120.

(Wireless Communication Unit 120)

The wireless communication unit 120 wirelessly communicates with the UE 300 that is positioned within the macro cell 10. As an example, the wireless communication unit 120 wirelessly communicates with the UE 300 using a frequency band of the 2 MHz band. The wireless communication unit 120 includes, for example, a radio frequency (RF) circuit and other circuits.

(Network Communication Unit 130)

The network communication unit 130 communicates with other devices. For example, the network communication unit 130 communicates with the pico eNodeB 200. The network communication unit 130 includes, for example, a communication interface for any type of wired communication.

(Storage Unit 140)

The storage unit 140 stores programs and data for operations of the macro eNodeB 100. The storage unit 140 includes a storage medium, for example, a hard disk, a semiconductor memory, or the like.

(Control Unit 150)

The control unit 150 provides various functions of the macro eNodeB 100. For example, the control unit 150 corresponds to a processor such as a CPU or a DSP, and provides the various functions by causing programs stored in the storage unit 140 or other storage media to be executed. The control unit 150 includes an information acquisition unit 151 and a communication control unit 153.

(Information Acquisition Unit 151)

The information acquisition unit 151 acquires system information of a frequency band that is used in the pico cell 20 (which will be referred to hereinafter as "pico system information"). When, for example, the network communication unit 130 receives pico system information transmitted by the pico eNodeB 200, the information acquisition unit 151 acquires the pico system information.

(Communication Control Unit 153)

The communication control unit 153 controls wireless communication within the macro cell 10.

Transmission of System Information of a Pico Cell Side

Particularly in the present embodiment, the communication control unit 153 controls downlink transmission of the pico system information in the macro cell 10. For example, the wireless communication unit 153 causes the wireless communication unit 120 to perform downlink transmission of the pico system information in the macro cell 10. In other words, the wireless communication unit 153 causes the wireless communication unit 120 to transmit the pico system information in the macro cell 10.

Radio resource to be used in the downlink transmission of the pico system information (which will be referred to hereinafter as "resource for pico system information) is resource of a frequency band used in the macro cell 10. In addition, the resource for pico system information is resource that are not used in transmission of system information of the frequency band used in the macro cell 10 (which will be referred to hereinafter as "macro system information"). In other words, the communication control unit 153 causes the wireless communication unit 120 to transmit the pico system information using different radio resource from radio resource used in transmission of the macro system information.

In addition, for example, there are a plurality of pico cells 20 in the macro cell 10. In this case, the resource for pico system information are not used in transmission of system information of a frequency band used in another pico cell 20 (in other words, pico system information of another pico cell 20) either. In other words, the communication control unit 153 causes the wireless communication unit 120 to transmit pico system information of each pico cell 20 using discrete radio resource.

In addition, as an example, the resource for pico system information is resource of a physical downlink shared channel (PDSCH).

Note that the communication control unit 153 also controls, for example, downlink transmission of the macro system information in the macro cell 10. The communication control unit 153 generates, for example, macro system information. Then, the communication control unit 153 causes the wireless communication unit 120 to transmit the macro system information in the macro cell 10.

Notification of Radio Resource Used in Transmission of System Information of a Pico Cell Side In addition, the communication control unit 153 notifies the UE 300 positioned within the macro cell 10 of the resource for pico system information in the present embodiment. To be more specific, for example, the communication control unit 153 causes the wireless communication unit 120 to transmit information for specifying resource for pico system information to the UE 300 positioned within the macro cell 10. The information is, for example, information representing a position of the resource for pico system information in a frequency direction and a time direction (which will be referred to hereinafter as "location of pico system information (LPSI)"). LPSI includes, for example, a cycle, a subframe number, a position of a resource block in a frequency direction and a time direction, and the like.

In addition, the communication control unit 153 also notifies the UE of, for example, a pico cell ID for identifying the pico cell 20 along with the resource for pico system information. To be specific, for example, the communication control unit 153 causes the wireless communication unit 120 to transmit a combination of a pico cell ID and LPSI. Hereinbelow, a specific example of this will be described with reference to FIGS. 7 and 8.

FIG. 7 is an illustrative diagram for describing an example of information transmitted for notification of radio resource used in transmission of system information of a pico cell side. Referring to FIG. 7, three combinations of pico cell IDs and LPSI are shown. When there are three pico cells 20 in the macro cell 10, for example, a pico cell ID and LPSI are transmitted to the three respective pico cells 20.

Figure 8:
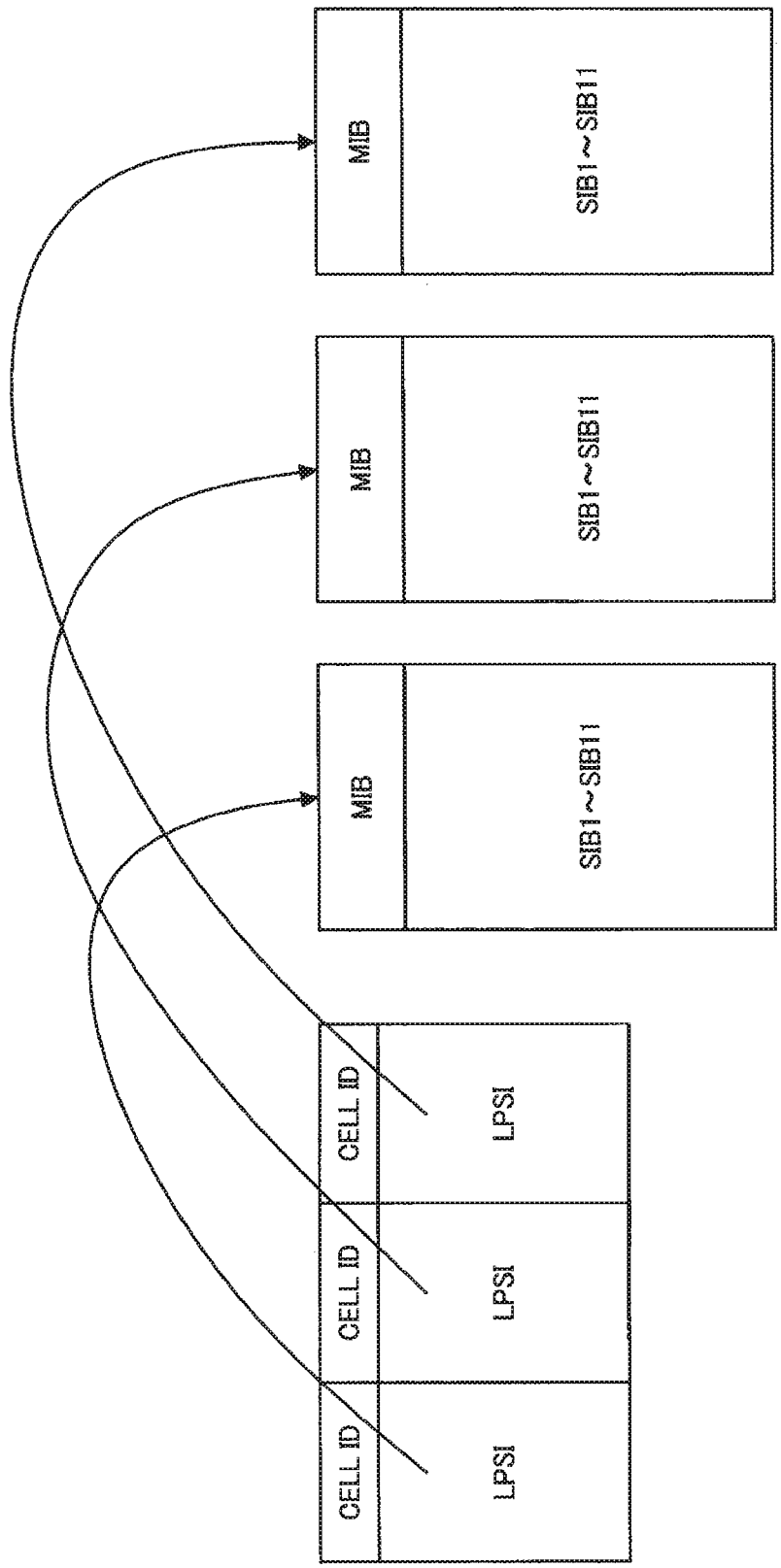
FIG. 8 is an illustrative diagram for describing an example of correspondences between LPSI and radio resource.

FIG. 8 is an illustrative diagram for describing an example of correspondences between LPSI and radio resource. Referring to FIG. 8, correspondences between the combinations of pico cell IDs and LPSI shown in FIG. 7 and radio resource represented by the LPSI are shown. In the radio resource represented by LPSI, system information including MIBs and SIBs is transmitted. With the LPSI with respect to each pico cell 20, the UE 300 can specify where pico system information of each pico cell is.

In addition, the resource for pico system information are notified of, for example, through signaling to the UE 300 that is in a connected state in the macro cell 10. To be more specific, for example, the communication control unit 153 causes the wireless communication unit 120 to transmit the combinations of the pico cell IDs and LPSI through RRC signaling to the UE 300 that is in the RRC connection mode in the macro cell 10. The communication control unit 153 may cause the wireless communication unit 120 to transmit the respective combinations of the pico cell IDs and LPSI separately from each other, or to transmit two or more of the combinations as a whole.

3.2. Configuration of a Pico eNodeB

Figure 9:
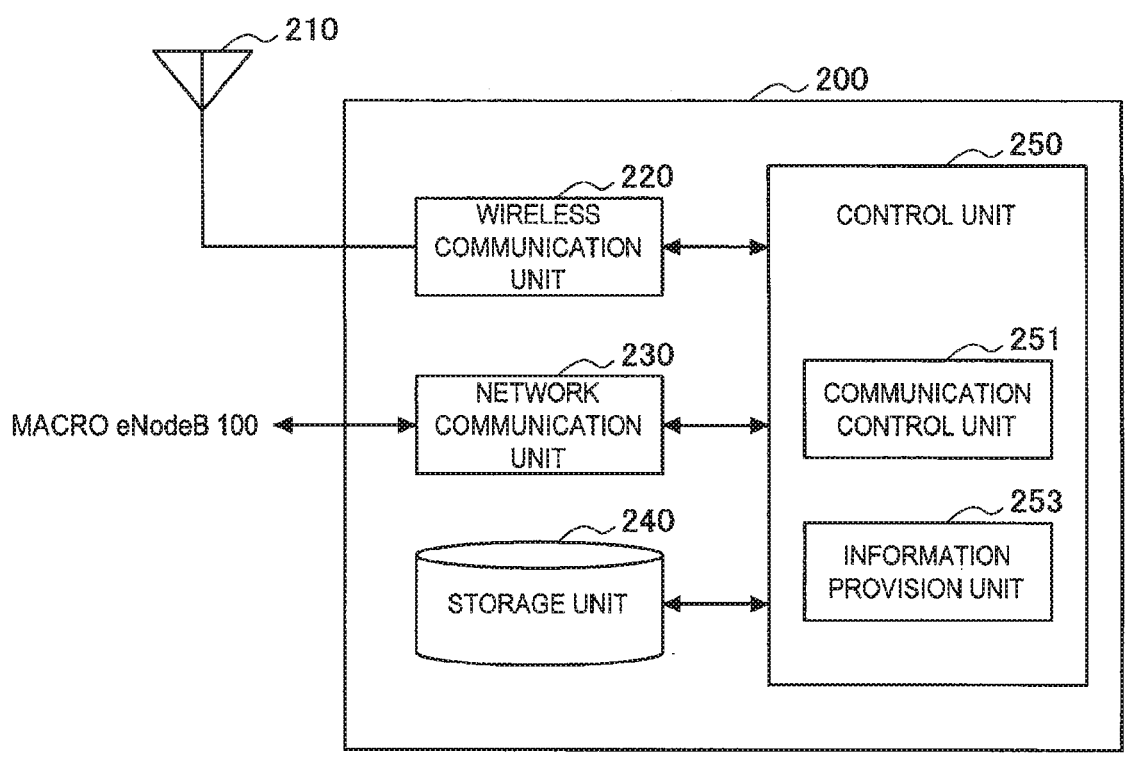
FIG. 9 is a block diagram showing an example of a configuration of a pico eNodeB according to an embodiment.

Next, an example of a configuration of the pico eNodeB 200 will be described with reference to FIG. 9. FIG. 9 is a block diagram showing the example of the configuration of the pico eNodeB 200 according to the present embodiment. Referring to FIG. 9, the pico eNodeB 200 is provided with an antenna unit 210, a wireless communication unit 220, a network communication unit 230, a storage unit 240, and a control unit 250.

(Antenna Unit 210)

The antenna unit 210 receives a radio signal and outputs the received radio signal to the radio communication unit 220. The antenna unit 210 transmits the transmitted signal output by the radio communication unit 220.

(Wireless Communication Unit 220)

The wireless communication unit 220 wirelessly communicates with the UE 300 that is positioned within the pico cell 20. As an example, the wireless communication unit 220 wirelessly communicates with the UE 300 using a frequency band of the 5 MHz band. The wireless communication unit 120 includes, for example, an RF circuit and other circuits.

(Network Communication Unit 230)

The network communication unit 230 communicates with other devices. For example, the network communication unit 230 communicates with the macro eNodeB 100. The network communication unit 230 includes, for example, a communication interface for any type of wired communication.

(Storage Unit 240)

The storage unit 240 stores programs and data for operations of the pico eNodeB 200. The storage unit 240 includes a storage medium, for example, a hard disk, a semiconductor memory, or the like.

(Control Unit 250)

The control unit 250 provides various functions of the pico eNodeB 200. For example, the control unit 250 corresponds to a processor such as a CPU or a DSP, and provides the various functions by causing programs stored in the storage unit 240 or other storage media to be executed. The control unit 250 includes a communication control unit 251 and an information provision unit 253.

(Communication Control Unit 251)

The communication control unit 251 controls wireless communication within the pico cell 20. Specifically, for example, the communication control unit 251 generates system information of a frequency band used in the pico cell 20 (in other words, pico system information). The system information includes, for example, an MIB and an SIB. The communication control unit 251 outputs the generated pico system information to the information provision unit 253.

In addition, for example, the pico system information is not transmitted in the pico cell 20. In other words, the communication control unit 251 does not cause the wireless communication unit 220 to transmit pico system information in the pico cell 20.

(Information Provision Unit 253)

The information provision unit 253 provides the pico system information to the macro eNodeB 100. To be specific, when the pico system information is output by the communication control unit 251, the information provision unit 253 acquires the pico system information. Then, the information provision unit 253 causes the network communication unit 230 to transmit the pico system information to the macro eNodeB 100.

3.3. Configuration of a UE

Figure 10:
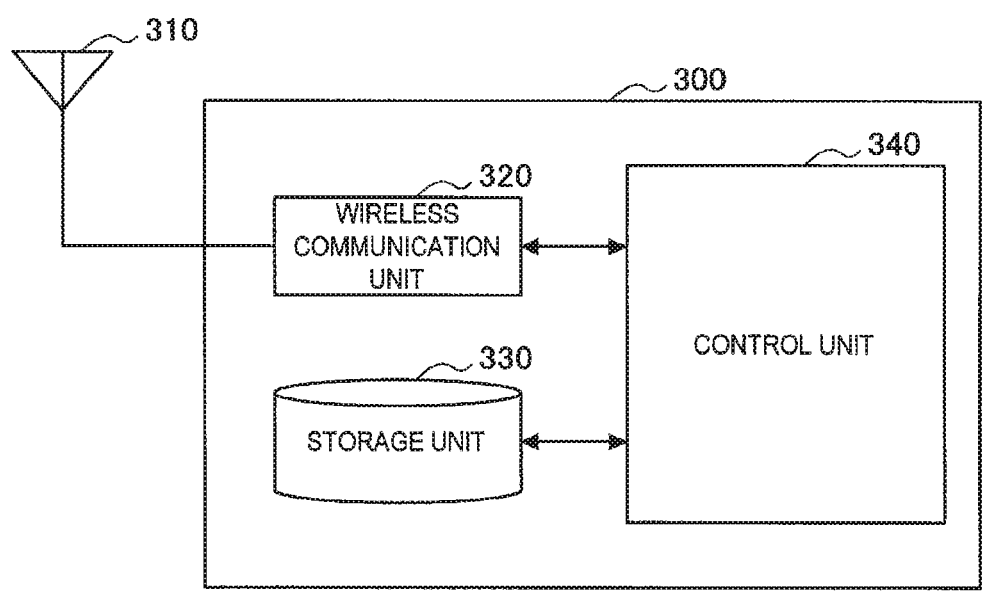
FIG. 10 is a block diagram showing an example of a configuration of a UE according to an embodiment.

Next, an example of a configuration of the UE 300 will be described with reference to FIG. 10. FIG. 10 is a block diagram showing the example of the configuration of the UE 300 according to the present embodiment. Referring to FIG. 10, the UE 300 is provided with an antenna unit 310, a wireless communication unit 320, a storage unit 330, and a control unit 340.

(Antenna Unit 310)

The antenna unit 310 receives a radio signal and outputs the received radio signal to the radio communication unit 220. The antenna unit 310 transmits a transmission signal output by the radio communication unit 320.

(Wireless Communication Unit 320)

The wireless communication unit 320 wirelessly communicates with the macro eNodeB 100 when it is positioned within the macro cell 10. In addition, the wireless communication unit 320 wirelessly communicates with the pico eNodeB 200 when it is positioned within the pico cell 20.

Particularly in the present embodiment, when the UE 300 is positioned within the macro cell 10, the wireless communication unit 320 receives system information of a frequency band used in the pico cell 20 (i.e., pico system information). To be more specific, for example, when the UE 300 is positioned within the macro cell, the wireless communication unit 320 receives pico system information transmitted by the macro eNodeB 100.

In addition, when, for example, the UE 300 is positioned within the macro cell 10, the wireless communication unit 320 receives information for specifying resource for pico system information. The information is, for example, LPSI. In addition, the wireless communication unit 320 also receives a pico cell ID along with the LPSI.

(Storage Unit 330)

The storage unit 330 stores programs and data for operations of the UE 300. The storage unit 330 includes a storage medium, for example, a hard disk, a semiconductor memory, or the like.

(Control Unit 340)

The control unit 340 provides various functions of the UE 300. For example, the control unit 340 corresponds to a processor such as a CPU or a DSP, and provides the various functions by causing programs stored in the storage unit 330 or other storage media to be executed.

For example, the control unit 340 acquires control information transmitted by the macro eNodeB 100 and the pico eNodeB 200. To be more specific, for example, the control unit 340 acquires the control information when the wireless communication unit 320 receives the control information. As an example, a position of radio resource in a frequency direction and a time direction in which each piece of control information is transmitted is known to the control unit 340. Therefore, the control unit 340 acquires information transmitted using the radio resource at the known position as control information.

Particularly, in the present embodiment, when the UE 300 is positioned within the macro cell 10 and radio resource used in downlink transmission of pico system information are notified of, the control unit 340 acquires information transmitted using the radio resource as the pico system information.

To be more specific, for example, when the UE 300 is positioned within the macro cell 10 and the wireless communication unit 320 receives a pico cell ID and LPSI, the control unit 340 acquires the pico cell ID and the LPSI. Accordingly, the control unit 340 can know radio resource that is used to transmit pico system information of the pico cell 20. Then, when the information transmitted using the radio resource is received by the wireless communication unit 320, the control unit 340 acquires the information as pico system information. In this way, the control unit 340 acquires the pico system information of the pico cell 20.

Note that, since the UE 300 can know the pico cell ID from a PSS and an SSS of the pico cell 20 in a cell search, the pico cell 20 found as a result of the cell search can be associated with the system information acquired based on the LPSI using the pico cell ID.

4. PROCESS FLOW

Figure 11:
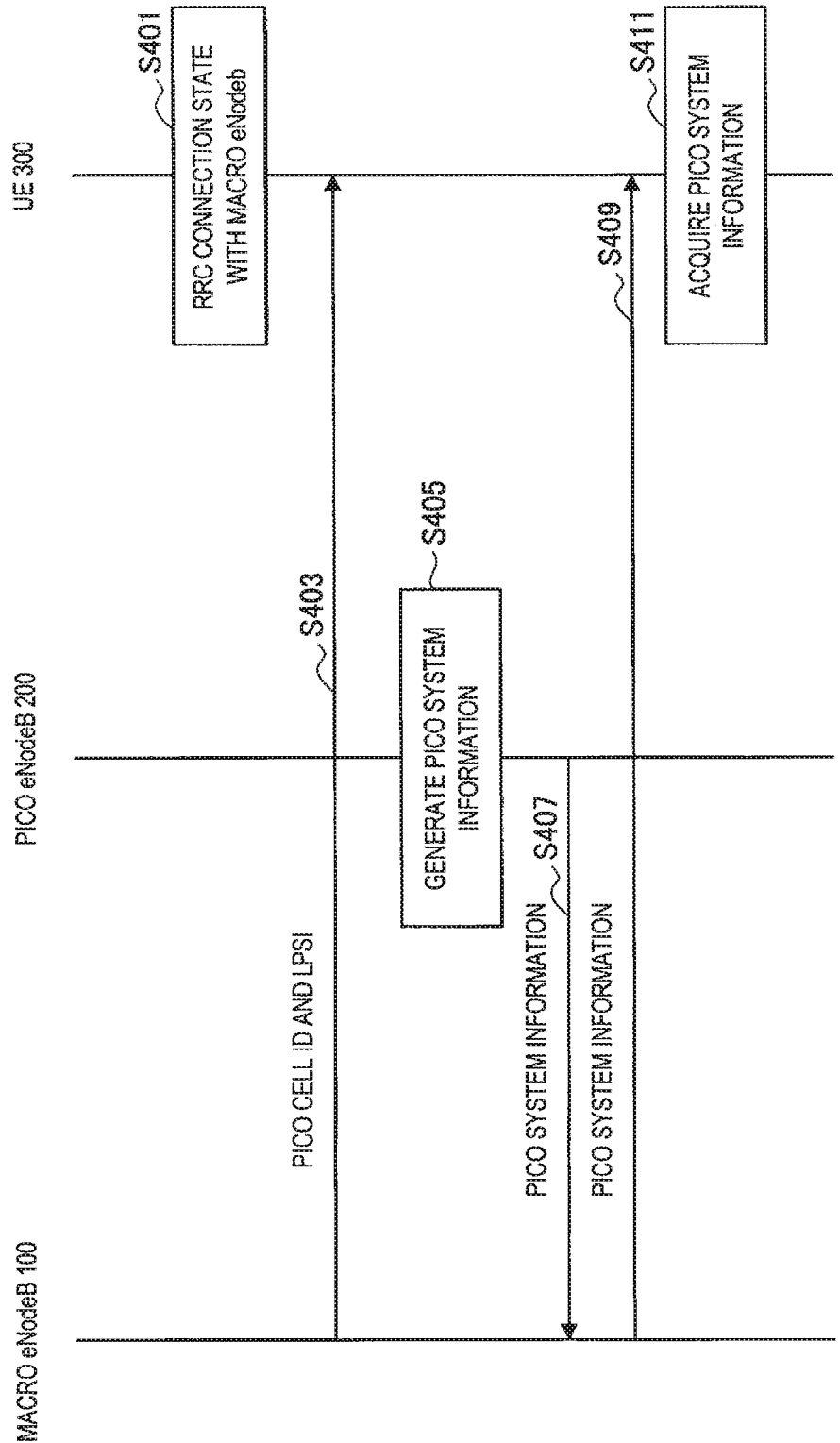
FIG. 11 is a sequence diagram showing an example of a schematic flow of a communication control process according to an embodiment.

Next, an example of a communication control process according to the present embodiment will be described with reference to FIG. 11. FIG. 11 is a sequence diagram showing an example of a schematic flow of the communication control process according to the present embodiment.

In Step S401, the UE 300 is in the RRC connection mode with the macro eNodeB 100.

In Step S403, the communication control unit 153 of the macro eNodeB 100 causes the wireless communication unit 120 to transmit a combination of a pico cell ID and LPSI. To be more specific, the communication control unit 153 causes the wireless communication unit 120 to transmit the combination of the pico cell ID and the LPSI through RRC signaling to the UE 300 that is in the RRC connection mode in the macro cell 10. Then, the wireless communication unit 320 of the UE 300 receives the combination of the pico cell ID and the LPSI, and the control unit 340 of the UE 300 acquires the combination of the pico cell ID and the LPSI.

In Step S405, the communication control unit 251 of the pico eNodeB 200 generates system information of a frequency band used in the pico cell 20 (i.e., pico system information). After that, in Step S407, the information provision unit 253 of the pico eNodeB 200 causes the network communication unit 230 to transmit the pico system information to the macro eNodeB 100. Then, the network communication unit 130 of the macro eNodeB 100 receives the pico system information and the information acquisition unit 151 acquires the pico system information.

In Step S409, the communication control unit 153 of the macro eNodeB 100 causes the wireless communication unit 120 to transmit the pico system information in the macro cell 10 using radio resource represented by the LPSI. Then, the wireless communication unit 320 of the UE 300 receives the pico system information using the radio resource represented by the LPSI.

After that, in Step S411, the control unit 340 of the UE 300 acquires the information transmitted and received using the radio resource represented by the LPSI as the pico system information.

The configurations of the respective devices and the process flow of the present embodiment have been described above. As described above, the UE 300 is notified of radio resource of the macro cell 10, then pico system information is transmitted in the macro cell 10 using the radio resource, and accordingly, the UE 300 can acquire the pico system information in the macro cell 10. In other words, an area in which the pico system information can be acquired is not limited to the pico cell 20, but expands to the macro cell 10. Thus, the UE 300 can acquire the pico system information of the pico cell 20 before the UE comes close to the pico cell 20. As a result, a time taken for connection of the UE 300 in the pico cell is shortened. For example, the UE 300 specifies the pico cell 20 in a cell search based on a PSS and an SSS from limited pico cells 20 corresponding to pico system information that has been acquired beforehand. For this reason, a time taken to specify a cell is shortened. In addition, for example, it is not necessary for the UE 300 to receive system information again after the cell search. For this reason, a time taken for connection in the pico cell 20 is shortened more.

Note that PDCCHs, each of which is a control channel in the macro cell 10 and the pico cell 20, for example, are present in both of the macro cell 10 and the pico cell 20 as in the related art. Mainly on the PDCCHs, release assignment information (i.e., scheduling information) is transmitted. The scheduling information includes downlink assignment (Downlink Assignment) and an uplink grant (Uplink Grant). The downlink assignment indicates which resource block (RB) among downlink RBs is the RB that a UE should receive. On the other hand, the uplink grant indicates which RB among uplink RBs is the RB that a UE should use in transmission. The reason is that deciding this scheduling information in each of eNodeBs (i.e., each macro eNodeB 100 and each pico eNodeB 200) simplifies implementation of the wireless communication system. When the pico eNodeB 200 is implemented as a remote radio head (RRH), transmission of scheduling information of the pico eNodeB side may also be possible on the PDCCH of the macro eNodeB side. When the pico eNodeB 200 is not implemented as an RRH, however, the presence of the PDCCHs in each cell (i.e., each macro cell and each pico cell) is considered to be natural.

In addition, in order to secure synchronization in a pico cell, transmission of synchronization signals of PSSs and SSSs by the pico eNodeB 200 is also considered to be natural.

On the other hand, taking the small area of the pico cell 20, transmission of system information of the pico cell 20, system information updating, paging channels, and the like in the macro cell 10 rather than the pico cell 20 is considered to be natural. In addition, signaling to the UE via the macro eNodeB 100 is considered to be desirable. This is because the pico eNodeB 200 should concentrate on transmission and reception of user data.

5. MODIFIED EXAMPLES

Next, a first modified example and a second modified example according to the present embodiment will be described with reference to FIGS. 12 to 19.

5.1. First Modified Example

First, the first modified example according to the present embodiment will be described with reference to FIGS. 12 to 16.

<5.1.1. Overview>

In the examples of the present embodiment described above, radio resource that is used in transmission of pico system information (i.e., resource for pico system information) are notified of through signaling (for example, RRC signaling) to the UE 300 that is in a connection state in the macro cell 10. In this case, the UE 300 that is not in a connection state in the macro cell 10 (i.e., the UE 300 in an idle state) does not receive a notification through signaling, and thus fails to acquire pico system information. For this reason, it is not possible to cause the above-described examples to correspond to a case in which, for example, the UE 300 intends to perform wireless communication in a specific pico cell 20 and then is in a connection state in the macro cell 10.

Thus, in the first modified example of the present embodiment, resource for pico system information are notified of using radio resource for notification that have a predetermined positional relation with other radio resource that is used in transmission of a predetermined information block included in macro system information. To be specific, for example, LPSI is transmitted using radio resource for notification that have a predetermined positional relation with other radio resource that is used in transmission of a predetermined information block included in macro system information.

Even a UE 300 that is not in a connection state in the macro cell 10 can acquire system information of the macro cell 10. Thus, according to the first modified example, when the UE 300 that is not in a connection state in the macro cell 10 acquires the predetermined information block, information transmitted with radio resource that has a predetermined positional relation with radio resource for transmission of the information block can be acquired as information that represents resource for the pico system information (i.e., LPSI). Then the UE 300 can acquire information transmitted with the resource for pico system information represented by the information as pico system information. In other words, the UE 300 can acquire pico system information even when it is not in a connection state in the macro cell 10.

<5.1.2. Configurations of Respective Devices>

Next, configurations of respective devices according to the first modified example of the present embodiment will be described with reference to FIGS. 12 to 15. Herein, only changes from the content that has already been described with reference to FIGS. 6, 9, and 10 will be described.

(Macro eNodeB 100)

Communication Control Unit 153

As described above, resource for pico system information are notified of using radio resource for notification that have a predetermined positional relation with other radio resource that is used in transmission of a predetermined information block included in macro system information. To be specific, the communication control unit 153 causes the wireless communication unit 120 to transmit a pico cell ID and LPSI using radio resource for notification that have a predetermined positional relation with other radio resource that is used in transmission of a predetermined information block included in macro system information.

The other radio resource used in transmission of the predetermined information block included in the macro system information is, for example, resource positioned within a predetermined range of a time direction and a frequency direction. As an example, the predetermined information block is the SIB 1 among system information blocks (SIBs). In addition, the other radio resource is resource used in transmission of the SIB 1. In other words, the communication control unit 153 causes the wireless communication unit 120 to transmit the pico cell ID and LPSI using radio resource that has a predetermined positional relation with the radio resource used in transmission of the SIB 1. Hereinbelow, the position of the radio resource used in transmission of the SIB 1 will be described with reference to FIG. 12.

Figure 12:
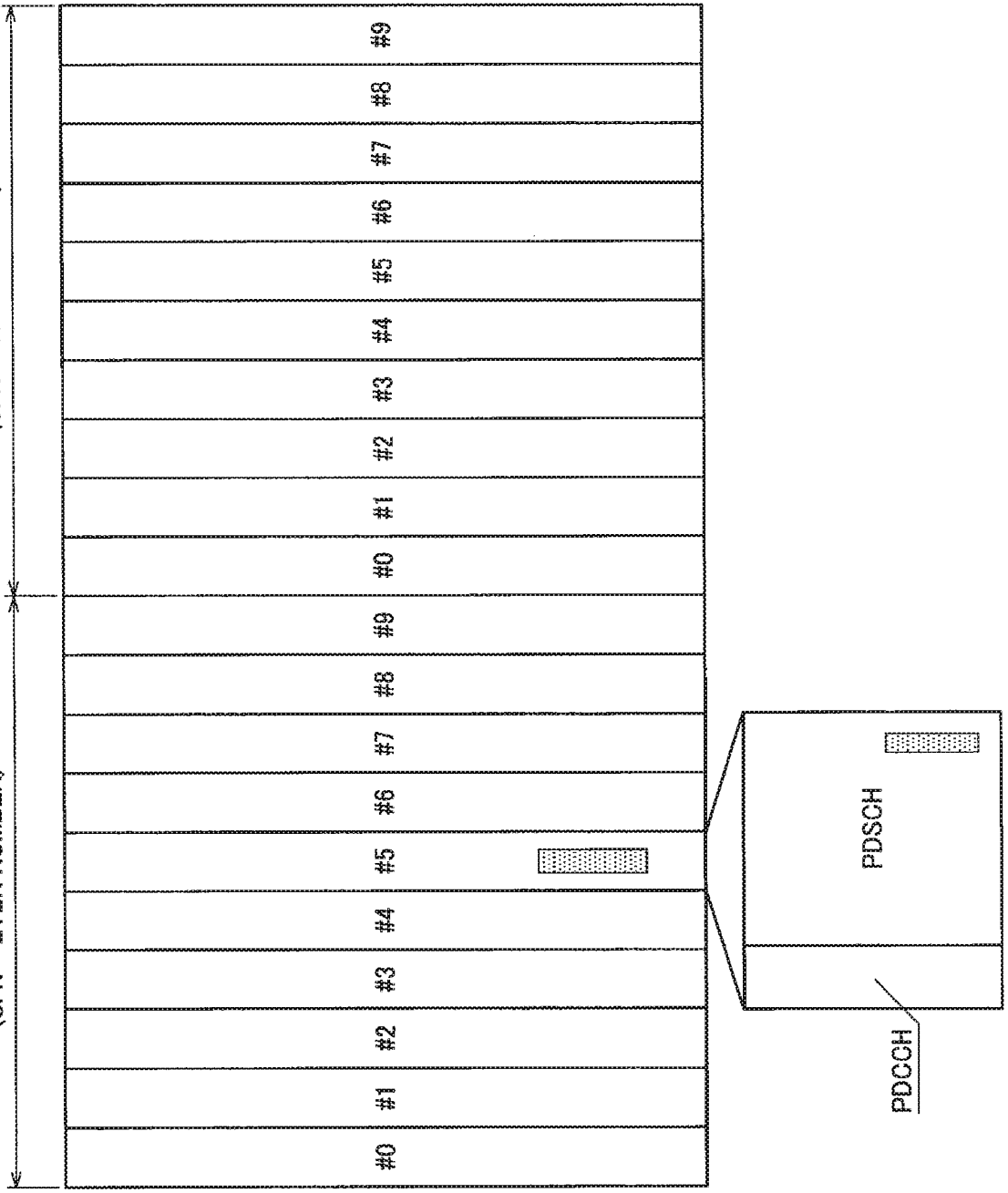
FIG. 12 is an illustrative diagram for describing an example of a position of radio resource used in transmission of SIB 1.

FIG. 12 is an illustrative diagram for describing an example of a position of radio resource used in transmission of the SIB 1. Referring to FIG. 12, two consecutive radio frames, i.e., a radio frame whose SFN is an even number and a radio frame whose SFN is an odd number, are shown. In addition, the SIB 1 is transmitted in a #5 subframe of the radio frame whose SFN is an even number. To be more specific, the SIB 1 is transmitted on a PDSCH in the #5 subframe. To be more specific, the position of the SIB 1 is fixed in the time direction in the #5 subframe, but variable in the frequency direction. The position of the SIB 1 in the frequency direction is notified of using an MIB 1. In the first modified example of the present embodiment, LPSI is transmitted with radio resource that has a predetermined positional relation with semi-fixed radio resource used in transmission of the SIB 1.

In addition, the predetermined positional relation is a positional relation that has a predetermined offset with the other radio resource in the time direction and the frequency direction. As an example, the predetermined positional relation is a positional relation that has a predetermined offset with the radio resource used in the transmission of the SIB 1 in the time direction and the frequency direction. In other words, the communication control unit 153 causes the wireless communication unit 120 to transmit the pico cell ID and the LPSI using radio resource that has a predetermined offset with the radio resource used in the transmission of the SIB 1 in the time direction and the frequency direction. Hereinbelow, a specific example of radio resource that has a predetermined offset will be described with reference to FIGS. 13 to 15.

Figure 13:
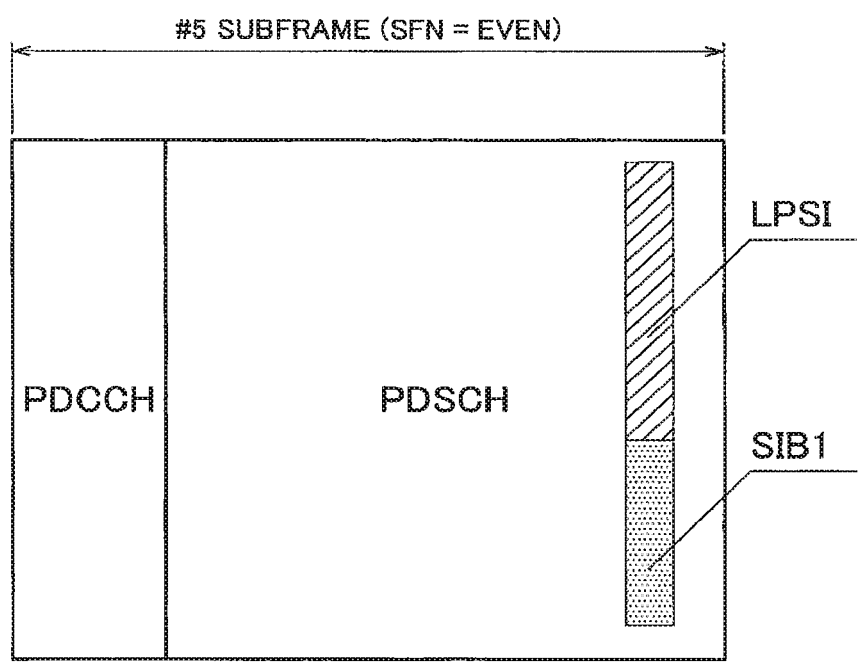
FIG. 13 is an illustrative diagram for describing a first example of radio resource used in transmission of LPSI according to a first modified example of an embodiment.

FIG. 13 is an illustrative diagram for describing a first example of radio resource used in transmission of LPSI according to the first modified example of the present embodiment. Referring to FIG. 13, radio resource of the macro cell 10 in the #5 subframe of the radio frame whose SFN is an even number are shown. As shown in FIG. 13, for example, the radio resource used in transmission of LPSI have a predetermined offset with radio resource used in transmission of the SIB 1 in the frequency direction.

Figure 14:
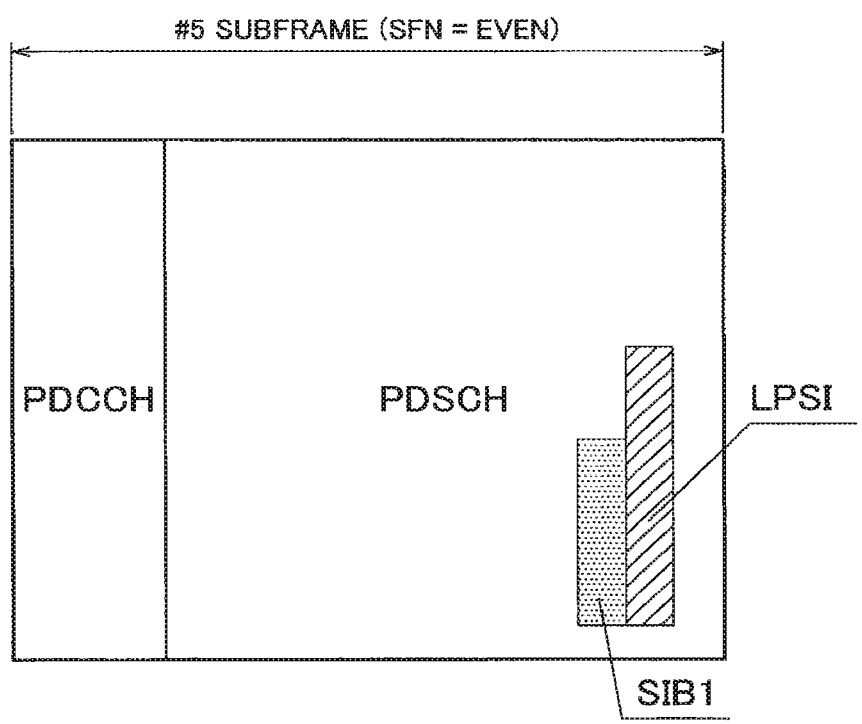
FIG. 14 is an illustrative diagram for describing a first example of radio resource used in transmission of LPSI according to a second modified example of an embodiment.

FIG. 14 is an illustrative diagram for describing a second example of the radio resource used in transmission of LPSI according to the first modified example of the present embodiment. Referring to FIG. 14, radio resource of the macro cell 10 in the #5 subframe of the radio frame whose SFN is an even number are shown. As shown in FIG. 14, for example, the radio resource used in transmission of the LPSI has a predetermined offset with the radio resource used in transmission of the SIB 1 in the time direction. To be more specific, the radio resource used in transmission of the LPSI are transmitted in the #5 subframe, and transmitted using an OFDM symbol different from that of the radio resource used in transmission of the SIB 1.

Figure 15:
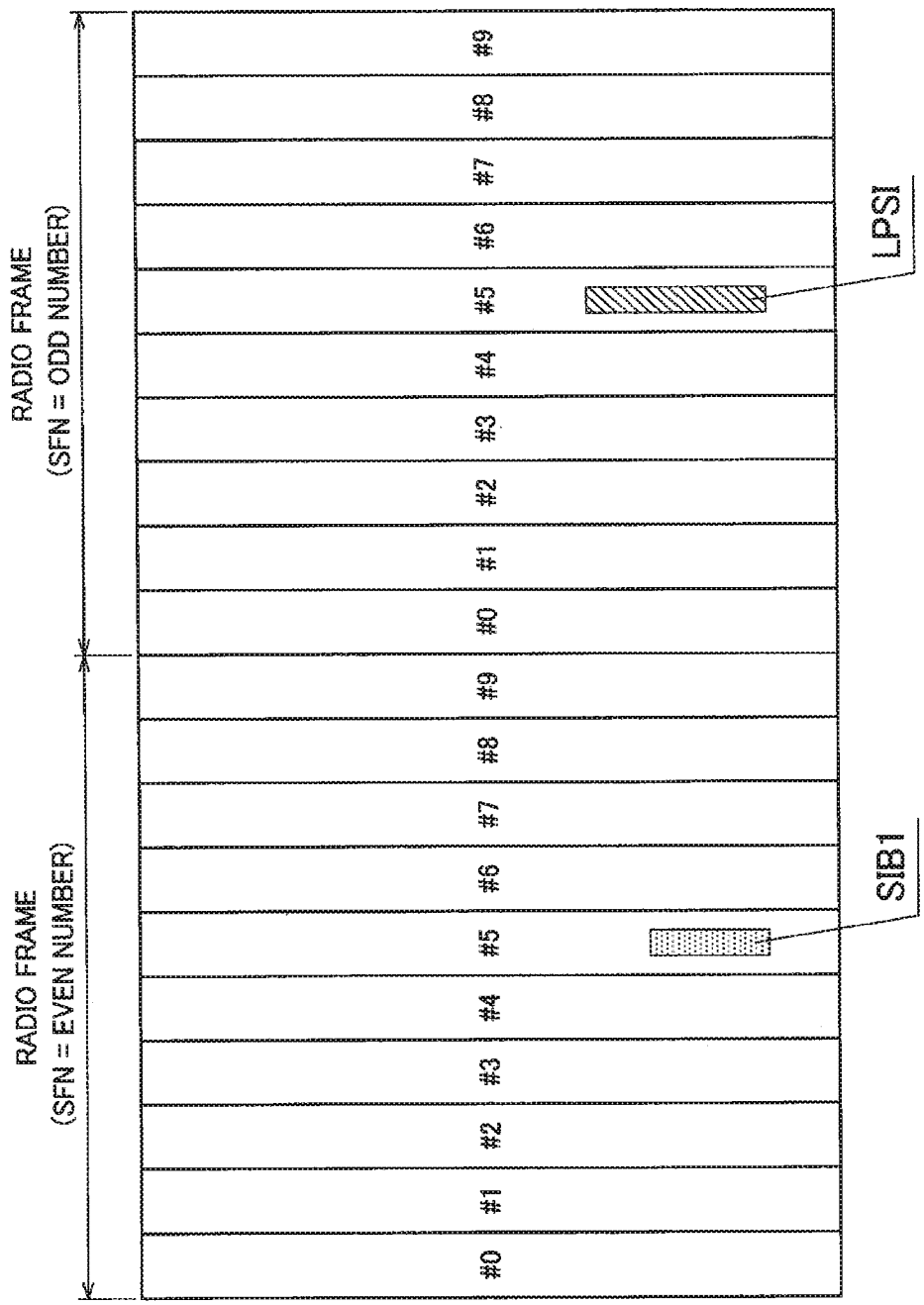
FIG. 15 is an illustrative diagram for describing a first example of radio resource used in transmission of LPSI according to a third modified example of an embodiment.

FIG. 15 is an illustrative diagram for describing a third example of the radio resource used in transmission of LPSI according to the first modified example of the present embodiment. Referring to FIG. 15, two consecutive radio frames, i.e., a radio frame whose SFN is an even number and a radio frame whose SFN is an odd number, are shown. In addition, the SIB 1 is transmitted in the #5 subframe whose SFN is an even number. On the other hand, the LPSI is transmitted in the #5 subframe whose SFN is an odd number. The radio resource used in transmission of the LPSI have an offset of one radio frame with respect to the radio resource used in transmission of the SIB 1 in the time direction.

Note that the radio resource used in transmission of the LPSI have predetermined offsets with the radio resource used in transmission of the SIB 1 in the frequency direction and the time direction as above. Note that the predetermined offset is not limited to the above-described example, and various offsets can be applied. In addition, the predetermined offset is not limited to one offset of those in the frequency direction and the time direction, and predetermined offsets in both of the frequency direction and the time direction can be applied.

Note that, for example, the pico cell ID also is transmitted using radio resource that has the predetermined offset along with the LSPI.

(UE 300)

Control Unit 340

If radio resource used in downlink transmission of pico system information (i.e., resource for pico system information) are notified of when the UE 300 is positioned within the macro cell 10, the control unit 340 acquires information transmitted using the radio resource as the pico system information. Particularly in the first modified example of the present embodiment, the resource for pico system information is notified of using radio resource for notification that have a predetermined positional relation with other radio resource that is used in transmission of a predetermined information bock included in macro system information. In other words, the control unit 340 receives a notification of the resource for pico system information using the radio resource for notification. To be specific, for example, a pico cell ID and LSPI transmitted using radio resource that have a predetermined positional relation with the radio resource used in transmission of the SIB 1 are received by the wireless communication unit 320. Then, the control unit 340 acquires information transmitted using the radio resource that has the predetermined positional relation as the pico cell ID and the LSPI. Note that details of the predetermined positional relation are as described above.

<5.1.3. Process Flow>

Figure 16:
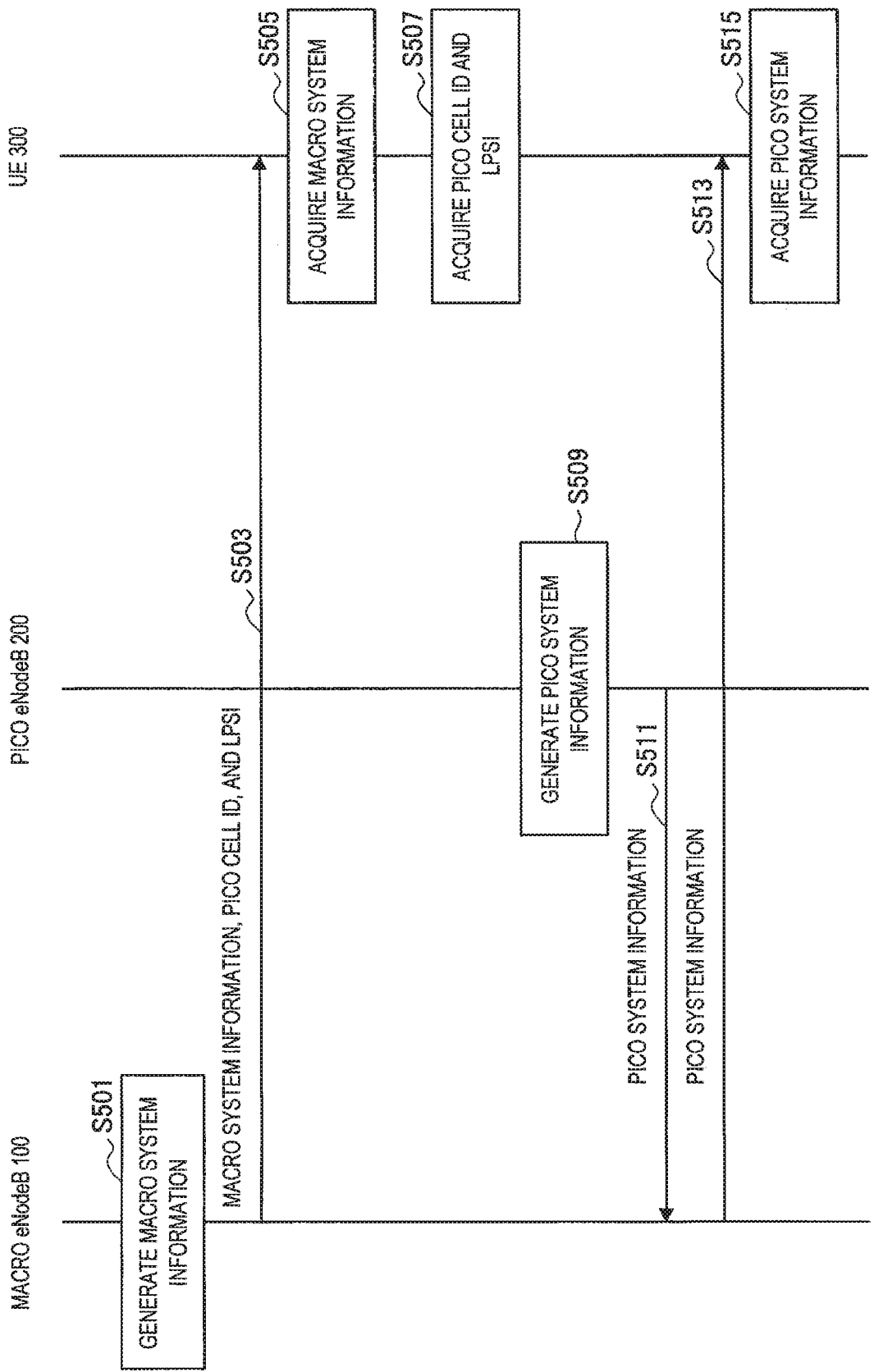
FIG. 16 is a sequence diagram showing an example of a schematic flow of a communication control process according to the first modified example of an embodiment.

Next, an example of a communication control process according to the first modified example of the present embodiment will be described with reference to FIG. 16. FIG. 16 is a sequence diagram showing an example of a schematic flow of the communication control process according to the first modified example of the present embodiment.

In Step S501, the communication control unit 153 of the macro eNodeB 100 generates macro system information.

Then, in Step S503, the communication control unit 153 of the macro eNodeB 100 causes the wireless communication unit 120 to transmit the macro system information in the macro cell 10. In addition, the communication control unit 153 causes the wireless communication unit 120 to transmit the pico cell ID and the LPSI using radio resource that has a predetermined offset with radio resource that is used in transmission of the SIB 1 of the macro system information. On the other hand, the wireless communication unit 320 of the UE 300 receives the macro system information, and receives the pico cell ID and the LPSI using the radio resource that has the predetermined offset.

In Step S505, the control unit 340 of the UE 300 acquires the macro system information. In addition, in Step S507, the control unit 340 acquires the pico cell ID and the LPSI. To be specific, for example, the control unit 340 acquires information transmitted using the radio resource that has the predetermined offset with the radio resource used in transmission of the SIB 1 as the pico cell ID and the LPSI.

In Step S509, the communication control unit 251 of the pico eNodeB 200 generates pico system information. Then, in Step S511, the information provision unit 253 of the pico eNodeB 200 causes the network communication unit 230 to transmit the pico system information to the macro eNodeB 100. Then, the network communication unit 130 of the macro eNodeB 100 receives the pico system information, and the information acquisition unit 151 thereof acquires the pico system information.

In Step S513, the communication control unit 153 of the macro eNodeB 100 causes the wireless communication unit 120 to transmit the pico system information in the macro cell 10 using radio resource represented by the LPSI. Then, the wireless communication unit 320 of the UE 300 receives the pico system information using the radio resource represented by the LPSI.

Then, in Step S515, the control unit 340 of the UE 300 acquires the information transmitted and received using the radio resource represented by the LPSI as the pico system information.

5.2. Second Modified Example

Next, the second modified example according to the present embodiment will be described with reference to FIGS. 17 to 19.

<5.2.1. Overview>

As described above, pico system information is transmitted by the macro eNodeB 100 in the embodiment and the first modified example of the embodiment. For this reason, updating of system information is also basically transmitted by the macro eNodeB 100. In such a case, if updating of both of macro system information and pico system information is notified of as notification of system information updating, the frequency of system information updating becomes very high. For example, if there are 20 pico cells 20 within the macro cell 10, updating of system information is frequently performed. Then, a process on the UE 300 side occurs each time system information is updated. As a result, the UE 300 increasingly consumes power.

Thus, in the second modified example of the embodiment, updating of system information of a frequency band used in the pico cell 20 (i.e., pico system information) is notified of independently of updating of system information of the frequency band used in the macro cell 10 (i.e., macro system information). For example, updating of pico system information is notified of along with resource for pico system information. To be more specific, for example, information representing updating of pico system information is transmitted along with LPSI.

When updating of macro system information together with pico system information is set to be notified of, if one of the macro system information and pico system information is updated, it is notified of as updating of system information. Thus, the UE 300 that wirelessly communicates only in the macro cell 10 checks updating of system information even when only pico system information has been updated. As a result, a load of the UE 300 increases. Thus, by setting updating of macro system information to be notified of separately from updating of pico system information as described above, the UE 300 that wirelessly communicates only in the macro cell 10 can check updating of system information only when the macro system information has been updated. As a result, the frequency of the UE 300 that wirelessly communicates only in the macro cell 10 checking updating of system information can be suppressed.

<5.2.2. Configurations of Respective Devices>

Next, configurations of the respective devices according to the second modified example of the embodiment will be described with reference to FIGS. 17 and 18. Herein, only changes from the first modified example of the embodiment will be described.

(Macro eNodeB 100)

Communication Control Unit 153

The communication control unit 153 performs notification of updating of system information. For example, the communication control unit 153 performs notification of macro system information. To be more specific, the communication control unit 153 performs notification of updating of macro system information using a paging channel. In addition, the communication control unit 153 performs notification of updating of macro system information using the SIB 1 of the macro system information.

Particularly, in the second modified example of the embodiment, the communication control unit 153 performs updating of pico system information independently of updating of macro system information. To be more specific, for example, the communication control unit 153 does not perform notification of updating of pico system information using the paging channel and the SIB 1.

In addition, updating of system information of a frequency band used in the pico cell 20 (i.e., pico system information), for example, is notified of independently of updating of system information of a frequency band used in another pico cell 20 (i.e., pico system information of another cell 20). In other words, the communication control unit 153 separately performs notification of updating of pico system information for each pico cell 20.

In addition, for example, updating of pico system information is notified of along with radio resource used in the downlink transmission of the pico system information (i.e., resource for the pico system information). In other words, the communication control unit 153 performs notification of updating of pico system information along with resource for the pico system information. To be more specific, for example, the communication control unit 153 transmits information indicating whether or not pico system information has been updated (which will be referred to hereinafter as "pico system information updating information") to the wireless communication unit 120 along with a cell ID and LPSI. Hereinbelow, this will be described in detail with reference to FIGS. 17 and 18.

FIG. 17 is an illustrative diagram for describing an example of information transmitted for notification of updating of system information of a pico cell side. Referring to FIG. 17, three combinations each having a pico cell ID, LPSI, and pico system information updating information (UPDATE INFO) are shown. When, for example, there are three pico cells 20 in the macro cell 10, pico cell IDs, LPSI, and pico system information updating information of the three respective pico cells 20 are transmitted.

Figure 18:
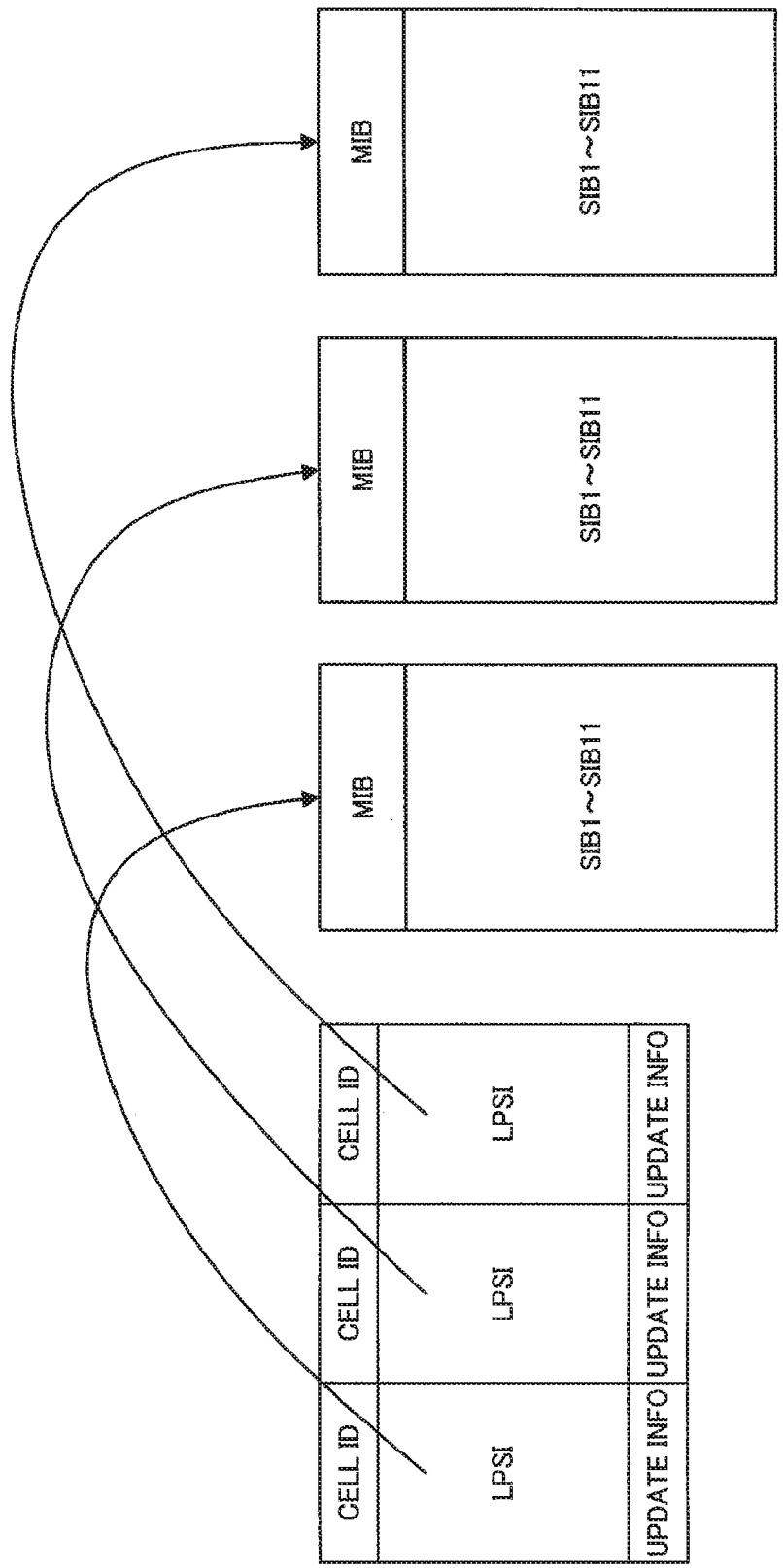
FIG. 18 is an illustrative diagram for describing an example of correspondences between pico system information and information transmitted to notify of updating of the pico system information.

FIG. 18 is an illustrative diagram for describing an example of correspondences between pico system information and information transmitted to notify of updating of the pico system information. Referring to FIG. 18, the correspondences between the combinations of the pico cell IDs, LPSI, and pico system information updating information shown in FIG. 17 and radio resource represented by the LPSI are shown. In the radio resource represented by the LPSI, system information including MIBs and SIBs is transmitted. With the pico system information updating information of each of the pico cells 20, the UE 300 can know whether or not individual pico system information of each pico cell 20 has been updated.

Note that, as described as the first modified example of the present embodiment, for example, resource for pico system information are notified of using radio resource for notification that have a predetermined positional relation with other radio resource that is used in transmission of a predetermined information block included in macro system information. Thus, updating of the pico system information is also notified of using the radio resource for notification that have a predetermined positional relation with the other radio resource that is used in transmission of the predetermined information block. To be specific, for example, the communication control unit 153 causes the wireless communication unit 120 to transmit the pico cell IDs, LPSI, and pico system information updating information using the radio resource for notification that have the predetermined positional relation with the other radio resource that is used in transmission of the predetermined information block.

As an example, the predetermined information block is, for example, the SIB 1 of the macro system information. In addition, the predetermined positional relation is a positional relation that has a predetermined offset with the other radio resource used in transmission of the predetermined information block in the time direction or the frequency direction. In other words, the communication control unit 153 causes the wireless communication unit 120 to transmit the pico cell IDs, LPSI, and pico system information updating information using the radio resource that have the predetermined offset with the radio resource that is used in transmission of the SIB 1 of the macro system information.

(UE 300)

Control Unit 340

The control unit 340 is notified of updating of system information by the macro eNodeB. For example, the control unit 340 is notified of updating of macro system information. To be more specific, for example, the control unit 340 is notified of updating of macro system information using a paging channel and the SIB 1 of the macro system information.

Particularly in the second modified example of the present embodiment, the control unit 340 is notified of updating of pico system information independently of updating of the macro system information. To be more specific, for example, the control unit 340 is not notified of updating of pico system information using the paging channel and the SIB 1. In addition, for example, the control unit 340 is separately notified of updating of pico system information for each pico cell 20.

In addition, for example, the control unit 340 is notified of updating of pico system information along with resource for pico system information. To be more specific, for example, when pico system information updating information is received by the wireless communication unit 320 along with a cell ID and LPSI, the control unit 340 acquires the pico system information updating information along with the cell ID and the LPSI.

To be more specific, for example, the cell ID, the LPSI, and the pico system information updating information are transmitted using, for example, radio resource that have a predetermined positional relation with the radio resource used in transmission of the SIB 1, and then received by the wireless communication unit 320. Then, the control unit 340 acquires the information transmitted using the radio resource that has the predetermined positional relation as the pico cell ID, the LSPI, and the pico system information updating information.

<5.2.3. Process Flow>

Next, an example of a communication control process according to the second modified example of the embodiment will be described with reference to FIG. 19. FIG. 19 is a sequence diagram showing an example of a schematic flow of the communication control process according to the second modified example of the embodiment. Here, only Steps S521, S523, S525, and S527 which are differences between the example of the schematic flow of the communication control process according to the first modified example shown in FIG. 16 and the example of the schematic flow of the communication control process according to the second modified example shown in FIG. 19 will be described.

In Step S521, the communication control unit 153 of the macro eNodeB 100 causes the wireless communication unit 120 to transmit macro system information in the macro cell 10. In addition, the communication control unit 153 causes the wireless communication unit 120 to transmit a pico cell ID, LPSI, and pico system information updating information using radio resource that has a predetermined offset with radio resource that is used in transmission of the SIB 1 of the macro system information. On the other hand, the wireless communication unit 320 of the UE 300 receives the macro system information, and receives the pico cell ID, the LPSI, and the pico system information updating information using the radio resource that has the predetermined offset.

In Step S523, the control unit 340 of the UE 300 acquires the pico cell ID, the LPSI, and the pico system information updating information. To be specific, for example, the control unit 340 acquires information transmitted using the radio resource that has the predetermined offset with the radio resource used in transmission of the SIB 1 as the pico cell ID, the LPSI, and the pico system information updating information.

In Step S525, the control unit 340 of the UE 300 checks whether or not the pico system information has been updated from the pico system information updating information.

In Step S527, the control unit 340 of the UE 300 checks the updated spot of the pico system information when the pico system information has been updated.

<6. CONCLUSION

Hereinabove, the communication devices and processes according to embodiments of the present disclosure have been described using FIGS. 1 to 19. According to the embodiments relating to the present disclosure, system information of a frequency band that is used in the pico cell 20 (i.e., pico system information) is acquired, and downlink transmission of the pico system information in the macro cell 10 is controlled. In addition, the UE 300 that is positioned within the macro cell 10 is notified of radio resource that is used in the downlink transmission of the pico system information (i.e., resource for the pico system information).

By notifying the UE 300 of the radio resource in the macro cell 10 and transmitting the pico system information in the macro cell 10 using the radio resource as described above, the UE 300 can acquire the pico system information in the macro cell 10. In other words, an area in which the pico system information can be acquired is not limited to the pico cell 20, and expands to the macro cell 10. Thus, the UE 300 acquires the pico system information of the pico cell 20 before it comes close to the pico cell 20. As a result, a time taken for connection of the UE 300 in the pico cell becomes short. For example, the UE 300 specifies a pico cell 20 based on a PSS and an SSS from limited pico cells 20 which correspond to pico system information acquired in advance in a cell search. For this reason, a time necessary for specifying a cell is shortened. In addition, for example, it is not necessary for the UE 300 to receive system information again after the cell search. For this reason, a time taken for connection in the pico cell 20 is shortened more.

In addition, for example, the radio resource that is used in the downlink transmission of the pico system information (i.e., the resource for the pico system information) is resource of a frequency band that is used in the macro cell 10. In addition, the resource for the pico system information is resource that is not used in transmission of the system information of the frequency band that is used in the macro cell 10.

Radio resource that is used in transmission of macro system information (particularly, radio resource that is used in transmission of the MIB and SIB 1) have no spare bits with which other information is transmitted. Thus, when pico system information is also transmitted with the radio resource, there can be cases in which the radio resource is insufficient. That is to say, the radio resource should be expanded. Thus, if macro system information and pico system information are transmitted separately from each other as described above, there will not be such a case in which radio resource that is used in transmission of the macro system information are insufficient. Moreover, there is no need to expand the radio resource.

In addition, when macro system information and pico system information are transmitted separately from each other and only one of the macro system information and the pico system information is desired to be acquired, only the one can be selectively acquired. Thus, it is good for the UE 300 to acquire only necessary system information, and accordingly, a load of the UE 300 can be suppressed.

In addition, if pico system information is included as a part of macro system information, the frequency of updating the macro system information becomes high. In other words, when pico system information of any pico cell 20 is updated, the macro system information is updated. As a result, the UE 300 which wirelessly communicates only in the macro cell 10 checks updating of the system information more often than necessary, and a load of the UE 300 increases accordingly. Therefore, by transmitting the macro system information and the pico system information separately from each other as described above, the frequency of updating the macro system information can be suppressed. As a result, the frequency of the UE 300 that wirelessly communicates only in the macro cell 10 checking updating of system information can be suppressed.

In addition, for example, the resource for the pico system information are not used in transmission of system information of a frequency band that is used in another pico cell 20 (i.e., pico system information of another pico cell 20) either.

Accordingly, necessary pico system information can be selectively acquired from pico system information of a plurality of pico cells 20. Thus, it is good for the UE 300 to acquire only necessary pico system information, and accordingly, a load of the UE 300 can be suppressed.

In addition, when pico system information of a plurality of pico cells 20 is collectively transmitted, if pico system information of any pico cell 20 is updated, the updating of the pico system information is notified of. As a result, the UE 300 checks updating of pico system information each time pico system information of any pico cell 20 is updated regardless of whether pico system information of the pico cell 20 that relates to the device itself is updated. Accordingly, a load of the UE 300 increases. Therefore, by individually transmitting pico system information of each pico cell 20, a frequency of the UE 300 checking updating of pico system information can be suppressed.

In addition, for example, the resource for the pico system information is resource of a physical downlink shared channel.

Accordingly, the necessary amount of resource of pico system information can be secured, and thus even if the number of pico cells 20 increases, pico system information can be transmitted in the macro cell 10. In addition, if pico system information is transmitted on a physical downlink shared channel, a UE that need not acquire pico system information is not affected thereby at all, and therefore it gives no load to the UE.

In addition, for example, the resource for the pico system information is notified of through signaling to the UE 300 that is in a connection state in the macro cell 10.

Accordingly, the resource for the pico system information can be specified without a special operation of the UE 300 being performed.

In addition, for example, a pico cell ID for identifying the pico cell 20 is also notified of, along with the resource for the pico system information.

Accordingly, the UE 300 can know corresponding pico system information of pico cells 20 for all resource for the pico system information that are notified of Thus, the UE 300 can easily acquire pico system information of a desired pico cell 20.

In addition, for example, pico system information of a frequency band used in a pico cell 20 is not transmitted in the pico cell.

Accordingly, more radio resource can be used in transmission of user data in the pico cell 20.

In addition, according to the first modified example of the embodiment relating to the present disclosure, resource for pico system information are notified of using radio resource for notification that has a predetermined positional relation with other radio resource that is used in transmission of a predetermined information block included in macro system information.

Even a UE 300 that is not in a connection state in the macro cell 10 can acquire system information of the macro cell 10. Thus, according to the first modified example, when acquiring the predetermined information block, the UE 300 that is not in a connection state in the macro cell 10 can acquire information transmitted with radio resource that has the predetermined positional relation with the radio resource for transmission of the information block as information representing the resource for pico system information (i.e., LPSI). Then, the UE 300 can acquire information transmitted with the resource for the pico system information represented by the information as pico system information. In other words, the UE 300 can acquire pico system information even when the UE is not in a connection state in the macro cell 10.

In addition, for example, the other radio resource that is used in the transmission of the predetermined information block included in the macro system information is resource positioned within a predetermined range in a time direction and a frequency direction.

When the position of the radio resource used in transmission of the information block (for example, the SIB 1) significantly changes, the radio resource that has the predetermined positional relation (for example, the radio resource used in transmission of the LPSI) are not necessarily radio resource that can be freely used. For example, there is also a possibility of the radio resource that has the predetermined positional relation being radio resource to be used in transmission of another information block or other important control information. Thus, if the radio resource used in transmission of the information block is resource for transmission at a semi-fixed position as described above, the predetermined positional relation can be set so that the radio resource that has the predetermined positional relation is freely usable resource.

In addition, for example, the predetermined positional relation is a positional relation that has a predetermined offset with the other radio resource in the time direction or the frequency direction.

Accordingly, the UE 300 can easily specify the position of the radio resource that has the predetermined positional relation (for example, the radio resource used in transmission of the LPSI) from the position of the radio resource used in transmission of the information block (for example the SIB 1).

In addition, according to a third modified example of the embodiment relating to the present disclosure, updating of system information of a frequency band used in a pico cell 20 (i.e., pico system information) is notified of independently of updating of system information of the frequency band used in a macro cell 10 (i.e., macro system information).

When updating of macro system information and pico system information are collectively notified of, if one of the macro system information and the pico system information is updated, it is notified of as updating of system information. Thus, the UE 300 that wirelessly communicates only in the macro cell 10 checks the updating of system information even when only the pico system information is updated. As a result, a load of the UE 300 increases. Thus, by notifying of updating of the macro system information and updating of the pico system information separately from each other as described above, the UE 300 that wirelessly communicates only in the macro cell 10 can check updating of system information only when the macro system information has been updated. As a result, the frequency of the UE 300 that wirelessly communicates only in the macro cell 10 checking updating of system information can be suppressed.

In addition, for example, updating of system information of a frequency band used in a pico cell 20 (i.e., pico system information) is notified of independently of updating of system information of a frequency band used in another pico cell 20 (i.e., pico system information of another cell 20).

When updating of pico system information of a plurality of pico cells 20 is collectively notified of, if pico system information of any pico cell 20 among the plurality of pico cells 20 is updated, it is notified of as updating of system information. Thus, the UE 300 checks updating of pico system information even when pico system information of a pico cell 20 that is irrelevant to the device itself has been updated. As a result, a load of the UE 300 increases. Thus, as updating of pico system information of each pico cell 20 is individually notified of, the UE 300 can check updating of system information only when pico system information of a pico cell 20 that relates to the device itself has been updated. As a result, the frequency of the UE 300 checking updating of system information can be suppressed.

In addition, for example, updating of pico system information is notified of along with radio resource used in the downlink transmission of the pico system information (i.e., resource for the pico system information).

Accordingly, it is possible to check whether or not the pico system information has been updated like the pico system information resource.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Although, for example, the example in which the LPSI and the pico system information updating information are transmitted using radio resource that has a predetermined offset with radio resource used in transmission of the SIB 1 has been described in the second modified example as in the first modified example, the present disclosure is not limited thereto. For example, the LPSI and the pico system information updating information may be transmitted through RRC signaling.

In addition, although the example in which one frequency band is used in each of a macro cell and a pico cell has been described as an example, the present disclosure is not limited thereto. A plurality of frequency bands may be used in one or both of the macro cell and pico cell. As an example, a carrier application may be applied to a pico cell. In addition, system information of each CC used in a pico cell may be transmitted using a frequency band used in a macro cell. In addition, pico system information of each of CCs may be collectively transmitted in units of pico cells. In such a case, LPSI may represent the position of radio resource used to collectively transmit the pico system information in units of pico cells. Alternatively, pico system information of each of CCs may be individually transmitted in units of CCs. In this case, the LPSI may represent the position of the radio resource used to individually transmit the pico system information in units of CCs. Note that, as another example, a carrier application may be applied to a macro cell. In addition, system information of a frequency band used in a pico cell may be transmitted using any CC used in a macro cell.

In addition, although the example in which a CC used in a macro cell is a frequency band of the 2 MHz band and a frequency band used in a pico cell is a frequency band of the 5 GHz band has been described as an example, the present disclosure is not limited thereto. For example, a frequency band of the same band (for example, the 2 GHz band) may be used in both of a macro cell and a pico cell. In addition, a frequency band used in a macro cell and a frequency band used in a pico cell may be different frequency bands, or the same frequency band.

In addition, although the example in which the macro eNodeB and the pico eNodeB perform wired communication has been described, the present disclosure is not limited thereto. Instead of wired communication, wireless communication (for example, microwave communication) may be performed.

In addition, although the example in which the pico eNodeB is a normal eNodeB has been described, the present disclosure is not limited thereto. The pico eNodeB may be implemented as an RRH. In such a case, for example, a control unit of the pico eNodeB may be provided in a macro eNodeB or another communication control device.

In addition, the macro eNodeB may be configured by a plurality of devices rather than one device. For example, the macro eNodeB may include a communication control device that includes at least a control unit as one of the plurality of devices.

In addition, although the example of the wireless communication system based on LTE has been described, the present disclosure is not limited thereto. The technology relating to the present disclosure can also be applied to a wireless communication system of another communication standard in which transmission of system information is performed. Also, although description has been provided using the eNodeB as an example of a base station and the UE as an example of a terminal device, the present disclosure is not limited thereto. The technology relating to the present disclosure can also be applied to a base station and a terminal device that are based on another communication standard.

In addition, although the example in which a small cell that is partially or entirely overlapped by a macro cell is a pico cell has been described, the present disclosure is not limited thereto. The small cell may be, for example, a femto cell, a nano cell, or a micro cell.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

In addition, it is possible to create a computer program for causing hardware such as a CPU, ROM, and RAM built into a communication control device or a terminal device to exhibit functions similar to each structural element of the foregoing communication control device or terminal device.

Additionally, the present technology may also be configured as below.

(1)

A communication control device including:

an acquisition unit configured to acquire system information of a frequency band that is used in a small cell that is partially or entirely overlapped by a macro cell; and a control unit configured to control downlink transmission of the system information in the macro cell, wherein the control unit notifies a terminal device positioned within the macro cell of radio resource that is used in the downlink transmission.

(2)

The communication control device according to (1), wherein the radio resource is resource of a frequency band that is used in the macro cell and the resource that is not used in transmission of the system information of the frequency band.

(3)

The communication control device according to (2), wherein the radio resource is not used in transmission of system information of a frequency band that is used in another small cell either.

(4)

The communication control device according to (2) or (3), wherein the radio resource is resource of a physical downlink shared channel.

(5)

The communication control device according to any one of (2) to (4), wherein updating of the system information of the frequency band that is used in the small cell is notified of independently of updating of the system information of the frequency band that is used in the macro cell.

(6)

The communication control device according to (5), wherein updating of the system information of the frequency band that is used in the small cell is also notified of independently of updating of system information of a frequency band that is used in another small cell.

(7)

The communication control device according to (5) or (6), wherein, for the updating of the system information of the frequency band that is used in the small cell, information pertaining to the updating is notified of along with the radio resource.

(8)

The communication control device according to any one of (2) to (7), wherein the radio resource is notified of using radio resource for notification that has a predetermined positional relation with another radio resource that is used in transmission of a predetermined information block included in the system information of the frequency band used in the macro cell.

(9)

The communication control device according to (8), wherein the another radio resource is resource positioned within a predetermined range in a time direction and a frequency direction.

(10)

The communication control device according to (8) or (9), wherein the predetermined positional relation is a positional relation that has a predetermined offset with the another radio resource in a time direction or a frequency direction.

(11)

The communication control device according to any one of (2) to (7), wherein the radio resource is notified of through signaling to a terminal device that is in a connection state in the macro cell.

(12)

The communication control device according to any one of (2) to (11), wherein the control unit also notifies small cell identification information for identifying the small cell along with the radio resource.

(13)

The communication control device according to any one of (1) to (12), wherein the system information of the frequency band that is used in the small cell is not transmitted in the small cell.

(14)

A program causing a computer to function as:

an acquisition unit configured to acquire system information of a frequency band that is used in a small cell that is partially or entirely overlapped by a macro cell; and a control unit configured to control downlink transmission of the system information in the macro cell, wherein the control unit notifies a terminal device positioned within the macro cell of radio resource that is used in the downlink transmission.

(15)

A communication control method including:

acquiring system information of a frequency band that is used in a small cell that is partially or entirely overlapped by a macro cell;

controlling downlink transmission of the system information in the macro cell; and notifying a terminal device positioned within the macro cell of radio resource that is used in the downlink transmission.

(16)

A communication control device including:

a generation unit configured to generate system information of a frequency band that is used in a small cell that is partially ore entirely overlapped by a macro cell; and a provision unit configured to provide the system information to the device that is a device controlling downlink transmission of the system information in the macro cell and notifying a terminal device positioned within the macro cell of radio resource that is used in the downlink transmission.

(17)

A program causing a computer to function as:

a generation unit configured to generate system information of a frequency band that is used in a small cell that is partially or entirely overlapped by a macro cell; and a provision unit configured to provide the system information to a device that is a device controlling downlink transmission of the system information in the macro cell and notifying a terminal device positioned within the macro cell of radio resource that is used in the downlink transmission.

(18)

A communication control method including:

generating system information of a frequency band that is used in a small cell that is partially or entirely overlapped by a macro cell; and providing the system information to a device that is a device controlling downlink transmission of the system information in the macro cell and notifying a terminal device positioned within the macro cell of radio resource that is used in the downlink transmission.

(19)

A terminal device including:

a wireless communication unit configured to receive system information of a frequency band that is used in a small cell that is partially or entirely overlapped by a macro cell when the terminal device is positioned within the macro cell; and an acquisition unit configured to acquire information transmitted using radio resource as the system information when the terminal device is positioned within the macro cell and the radio resource that is used in downlink transmission of the system information is notified of.

(20)

A communication control method including:

receiving system information of a frequency band that is used in a small cell that is partially or entirely overlapped by a macro cell when a terminal device is positioned within the macro cell; and acquiring information transmitted using radio resource as the system information when the terminal device is positioned within the macro cell and the radio resource that is used in downlink transmission of the system information is notified of.

REFERENCE SIGNS LIST 10 macro cell
20 pico cell
100 macro eNodeB
110 antenna unit
120 wireless communication unit
130 network control unit
140 storage unit
150 control unit
151 information acquisition unit
153 communication control unit
200 pico eNodeB
210 antenna unit
220 wireless communication unit 230 network control unit
240 storage unit
250 control unit
251 communication control unit
253 information provision unit
300 pico eNodeB
310 antenna unit
320 wireless communication unit
330 storage unit
340 control unit

The invention claimed is:

1. A method for a user equipment, the method comprising:
establishing a Radio Resource Control (RRC) connection with a first base station;
aggregating at least two cells among two or more cells served by the first base station and two or more cells served by a second base station;
receiving, from the first base station, a first update indication of first system information for at least one of the two or more cells served by the first base station, the first update indication being received via at least one of a paging channel and a system information block type 1 message in at least one of the two or more cells served by the first base station; and
receiving, from the first base station, a second update indication of second system information for at least one of the two or more cells served by the second base station, the second update indication being received via a RRC signaling in the at least one of the two or more cells served by the first base station, wherein
the second update indication is received separately from the first update indication,
the first update indication is generated by the first base station, and
the second update indication is generated by the second base station and sent to the first base station from the second base station via an interface between the first base station and the second base station, before transmission of the second update indication from the first base station to the user equipment.

2. The method according to claim 1, wherein the second update indication is not received by the user equipment via the at least one of the paging channel and the system information block type 1 message in the at least one of the two or more cells served by the first base station.

3. The method according to claim 1, wherein the second update indication is received independently from the first update indication.

4. The method according to claim 2, wherein the second update indication is received independently from the first update indication.

5. The method according to claim 1, wherein the second update indication is transmitted independently from a transmission of the first update indication.

6. A method for a first base station, the method comprising:
establishing a Radio Resource Control (RRC) connection with a user equipment;
communicating with the user equipment aggregating at least two cells among two or more cells served by the first base station and two or more cells served by a second base station;
transmitting, to the user equipment, a first update indication of first system information for at least one of the two or more cells served by the first base station, the first update indication being transmitted via at least one of a paging channel and a system information block type 1 message in at least one of the two or more cells served by the first base station; and
transmitting, to the user equipment, a second update indication of second system information for at least one of the two or more cells served by the second base station, the second update indication being transmitted via a RRC signaling in the at least one of the two or more cells served by the first base station, wherein
the second update indication is transmitted separately from a transmission of the first update indication,
the first update indication is generated by the first base station, and
the second update indication is generated by the second base station and sent to the first base station from the second base station via an interface between the first base station and the second base station, before transmission of the second update indication from the first base station to the user equipment.

7. The method according to claim 6, wherein the second update indication is not transmitted to the user equipment via the at least one of the paging channel and the system information block type 1 message in the at least one of the two or more cells served by the first base station.

8. The method according to claim 6, wherein the second update indication is transmitted independently from a transmission of the first update indication.

9. The method according to claim 7, wherein the second update indication is transmitted independently from a transmission of the first update indication.

10. A user equipment comprising:
a transceiver; and
a processor configured to
establish a Radio Resource Control (RRC) connection with a first base station,
aggregate at least two cells among two or more cells served by the first base station and two or more cells served by a second base station,
receive, from the first base station via the transceiver, a first update indication of first system information for at least one of the two or more cells served by the first base station, the first update indication being received via at least one of a paging channel and a system information block type 1 message in at least one of the two or more cells served by the first base station, and
receive, from the first base station via the transceiver, second update indication of second system information for at least one of the two or more cells served by the second base station, the second update indication being received via a RRC signaling in the at least one of the two or more cells served by the first base station,
wherein the second update indication is received separately from the first update indication,
the first update indication is generated by the first base station, and
the second update indication is generated by the second base station and sent to the first base station from the second base station via an interface between the first base station and the second base station, before transmission of the second update indication from the first base station to the user equipment.

11. A first base station comprising:
a transceiver; and
a processor configured to
establish a Radio Resource Control (RRC) connection with a user equipment, communicate with a user equipment aggregating at least two cells among two or more cells served by the first base station and two or more cells served by a second base station, transmit, to the user equipment via the transceiver, a first update indication of first system information for at least one of the two or more cells served by the first base station, the first update indication being transmitted via at least one of a paging channel and a system information block type 1 message in at least one of the two or more cells served by the first base station, and transmit, to the user equipment via the transceiver, a second update indication of second system information for at least one of the two or more cells served by the second base station, the second update indication being transmitted via a RRC signaling in the at least one of the two or more cells served by the first base station, wherein the second update indication is transmitted separately from a transmission of the first update indication, the first update indication is generated by the first base station, and the second update indication is generated by the second base station and sent to the first base station from the second base station via an interface between the first base station and the second base station, before transmission of the second update indication from the first base station to the user equipment.

* * * * *